(12) United States Patent
Fritze

(10) Patent No.: US 8,182,699 B2
(45) Date of Patent: *May 22, 2012

(54) METHOD OF ENGAGING A FILTER CARTRIDGE TO A MANIFOLD AND FILTER CARTRIDGE THEREFOR

(75) Inventor: Karl Fritze, Denmark Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,017

(22) Filed: Aug. 20, 2010

(65) Prior Publication Data

US 2010/0307966 A1    Dec. 9, 2010

Related U.S. Application Data

(63) Continuation of application No. 12/336,003, filed on Dec. 16, 2008, now Pat. No. 7,799,220, which is a continuation of application No. 11/013,269, filed on Dec. 14, 2004, now Pat. No. 7,481,928, which is a continuation-in-part of application No. 10/202,290, filed on Jul. 24, 2002, now abandoned.

(60) Provisional application No. 60/559,593, filed on Apr. 5, 2004, provisional application No. 60/308,757, filed on Jul. 30, 2001.

(51) Int. Cl.
*B01D 35/30* (2006.01)
(52) U.S. Cl. ......... 210/767; 210/234; 210/248; 210/443
(58) Field of Classification Search .................. 210/234, 210/248, 433.1, 443, 767
See application file for complete search history.

(56) References Cited

U.S. PATENT DOCUMENTS

| 3,746,171 A | 7/1973 | Thomsen |
| 4,077,876 A | 3/1978 | Southall |
| 4,082,673 A | 4/1978 | Cilento |
| 4,461,394 A | 7/1984 | Sendel et al. |
| 4,515,692 A | 5/1985 | Chandler et al. |
| 4,735,716 A | 4/1988 | Petrucci et al. |
| 4,836,584 A | 6/1989 | Baker |
| 4,877,521 A | 10/1989 | Petrucci et al. |
| 4,915,831 A | 4/1990 | Taylor |

(Continued)

FOREIGN PATENT DOCUMENTS

DE    19905601    8/2000

(Continued)

OTHER PUBLICATIONS

International Search Report for PCT/US02/24098, mailed Dec. 16, 2002.

(Continued)

*Primary Examiner* — Matthew Savage

(57) ABSTRACT

A filter assembly for filtering water from an external source, the filter assembly having a manifold assembly and a filter cartridge. The filter cartridge includes a cartridge engagement means while the manifold includes a manifold engagement means. The cartridge engagement means and manifold engagement means cooperatively interfacing for removable attachment of the filter cartridge to the manifold assembly. The cartridge engagement means and manifold engagement means oriented in a retaining relation during removal of the cartridge filter from the manifold assembly such that any entrained pressure within the cartridge filter is vented while the cartridge engagement means and manifold engagement means are in the retaining relation.

20 Claims, 25 Drawing Sheets

U.S. PATENT DOCUMENTS

| | | | |
|---|---|---|---|
| 5,013,434 A | 5/1991 | Furrow | |
| 5,114,572 A | 5/1992 | Hunter et al. | |
| 5,132,009 A | 7/1992 | Futa et al. | |
| 5,215,655 A | 6/1993 | Mittermaier | |
| 5,269,919 A | 12/1993 | Von Medlin | |
| 5,302,284 A | 4/1994 | Zeiner et al. | |
| 5,336,406 A | 8/1994 | Stanford et al. | |
| 5,486,288 A * | 1/1996 | Stanford et al. | 210/235 |
| 5,548,893 A | 8/1996 | Koelfgen | |
| 5,591,332 A | 1/1997 | Reid et al. | |
| 5,753,107 A * | 5/1998 | Magnusson et al. | 210/109 |
| 6,027,644 A | 2/2000 | Magnusson et al. | |
| 6,099,735 A * | 8/2000 | Kelada | 210/652 |
| 6,193,884 B1 | 2/2001 | Magnusson et al. | |
| 6,360,764 B1 | 3/2002 | Fritze | |
| 7,481,928 B2 | 1/2009 | Fritze | |
| 7,799,220 B2 | 9/2010 | Fritze | |
| 2003/0019819 A1 | 1/2003 | Fritze | |
| 2004/0094468 A1 | 5/2004 | Fritze | |
| 2004/0251192 A1 * | 12/2004 | Fritze et al. | 210/321.6 |

FOREIGN PATENT DOCUMENTS

| | | |
|---|---|---|
| GB | 2333247 | 7/1999 |
| WO | WO 03/011425 | 2/2003 |
| WO | WO 2005/099862 | 10/2005 |

OTHER PUBLICATIONS

International Search Report for PCT/US2005/009749, mailed Sep. 6, 2005.

* cited by examiner

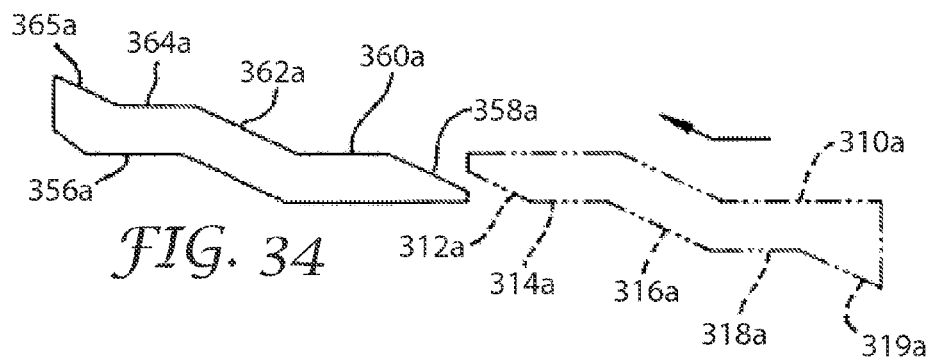
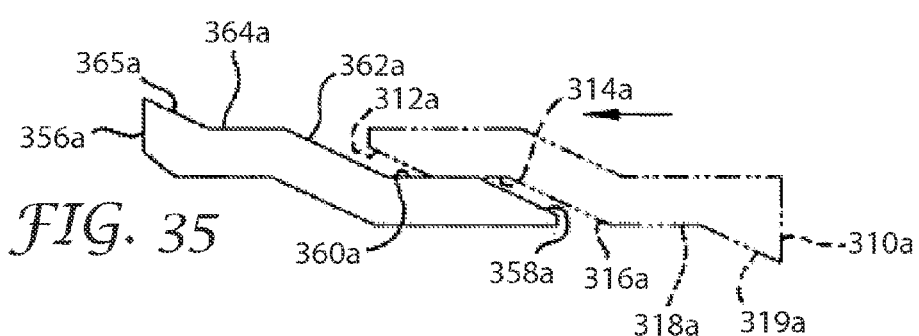
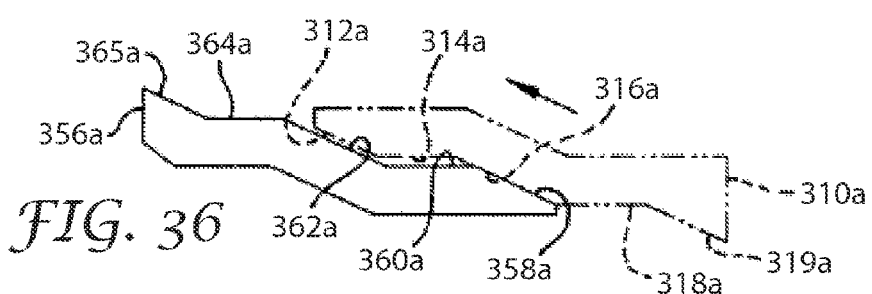
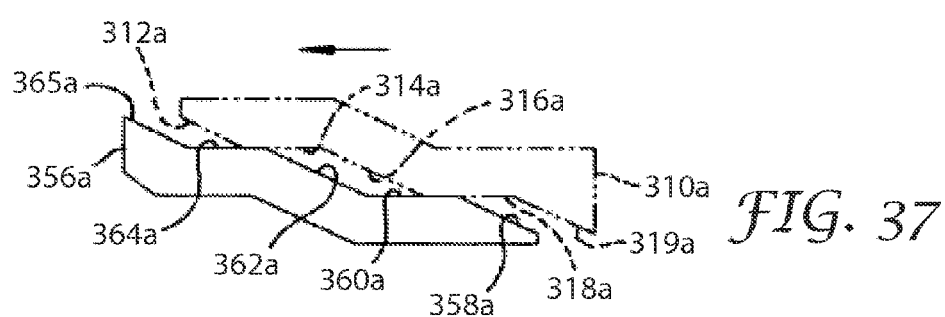
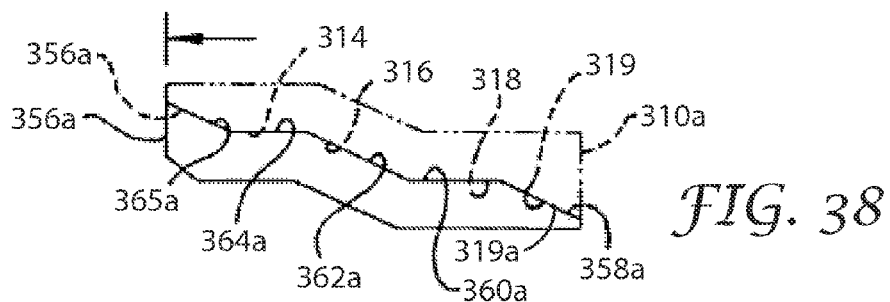

METHOD OF ENGAGING A FILTER CARTRIDGE TO A MANIFOLD AND FILTER CARTRIDGE THEREFOR

CROSS REFERENCE TO RELATED APPLICATIONS

The present application is a continuation of allowed U.S. patent application Ser. No. 12/336,003, filed Dec. 16, 2008, now U.S. Pat. No. 7,799,220, which is a continuation of U.S. patent application Ser. No. 11/013,269 entitled "HOT DISCONNECT REPLACEABLE WATER FILTER ASSEMBLY", filed Dec. 14, 2004, now U.S. Pat. No. 7,481,928, which claims the benefit of 60/559,593, filed Apr. 5, 2004 and is a continuation-in-part application of U.S. patent application Ser. No. 10/202,290, filed Jul. 24, 2002, now abandoned, which claims the benefit of U.S. provisional Application No. 60/308,757 filed Jul. 30, 2001. Each of the aforementioned applications is incorporated herein by reference.

BACKGROUND OF THE DISCLOSURE

The present disclosure relates generally to the field of residential and commercial filtration products, such as water filtration products. The filter assemblies can be used to filter any one of a range of fluids, such as water, oil, biological preparations, beer, wine, other beverages, other consumable liquids and the like. For convenience, the discussion below focuses on water filtration, although the filter assemblies can generally be used for other applications based on the disclosure herein.

Water filter assemblies, such as point-of-use water filtration systems have become increasingly common in the residential and commercial environment. There are many advantages to these types of systems in addition to the improvements to taste and appearance of the water. In situations where the source water has been municipally treated, point-of-use systems allow the water to retain the disinfecting properties imparted by the municipality until the moment of use such that chances of undesirable microbial contamination is correspondingly reduced. These point-of-use filtration systems can also be individually tailored to treat specific properties of the source water.

One disadvantage of point-of-use filtration systems in the residential and commercial environment is that they must be designed to fit in the limited spaces available to house the systems in these markets. As the design must be compact and unobtrusive, these systems must be designed to allow for frequent and easy replacement of used and exhausted filter elements. Because many of the users in the commercial and residential market may be unfamiliar with the potential dangers of working with a pressurized system, the filtration systems must also be designed with the safety of the user in mind.

To that end, during normal operation of the filters utilized in the point-of-use water filtration systems, the potential for self uncoupling, i.e., disconnection without user intervention, of the filter cartridge from the filter manifold should be eliminated to prevent unwanted leakage and subsequent disengagement of the filter assembly while also permitting the assembly to disconnect safely should an increased pressure condition occur beyond the structural failure point of the filter assembly. Further, the act of uncoupling the filter cartridge utilized in the point-of-use water filtration systems from the filter manifold utilized in the system should also permit the relief of any excess pressure in a controlled manner to reduce the risk of damage or personal injury to the point-of-use water filtration system user.

SUMMARY OF THE DISCLOSURE

Water filter assemblies of the present disclosure meet the aforementioned requirements of the commercial and residential markets. Generally, a representative embodiment of a water filter assembly comprises a cartridge assembly and a manifold assembly incorporating an interconnection design for at least resisting and preferably preventing or rapid, violent, and unintentional separation of the cartridge assembly from the manifold assembly as pressure in the water filter comes to equilibrium with the ambient pressure. In general, improved designs for engaging a cartridge filter with a manifold involve venting to the ambient atmosphere of the filter prior to the complete disengagement of the filter from the manifold. In some representative embodiments described herein, filter assemblies comprise improved engagement mechanisms for engaging a filter cartridge with a manifold in which representative embodiments of improved engagement mechanisms comprise helical threads and equivalents that perform an equivalent effective engagement. In additional or alternative representative embodiments, the engagement mechanism comprises a structure with two engagement configurations, one being a fully engaged configuration in which the flow channels provide for flow from the manifold through the filter and returning to the manifold and a second partly engaged configuration in which the filter cartridge is stably engaged with the manifold but the filter is vented to the ambient pressure.

One representative filter cartridge of the present disclosure comprises a representative cartridge top member and representative cartridge filter housing readily operatively connected to a representative manifold assembly. The representative cartridge top member is permanently attached to the representative cartridge filter housing through appropriate means such as, for example, spin or sonic welding or the use of adhesives and other equivalent means that sufficiently perform the required function thereof. In some presently preferred embodiments, in effecting such operative connection between the representative cartridge assembly and the representative manifold assembly, at least one seal provides a watertight seal between the representative cartridge assembly and the representative manifold. Additionally, at least two seals operative arranged in a series relationship provide for effecting a watertight seal between the unfiltered inlet water and the filtered outlet water to prevent contamination therebetween. In other representative embodiments, the watertight seals can be positioned in other suitable configurations so as to isolate the unfiltered water flow and the filtered water flow from each other and from the ambient environment.

One aspect of some representative embodiments of the manifold assembly and associated operatively connected cartridge top assembly comprise structure such that, during replacement of cartridge assemblies on the manifold assembly, the pressurized water being supplied to the manifold assembly is automatically and positively shutoff and any residual pressure within the filter assembly is sufficiently vented to allow benign disengagement during disconnection of the cartridge assembly from the manifold assembly. Accordingly, one or more pressure relief ports can be spaced around the sidewall of the receiver well of the cartridge top assembly to provide this venting after the supply water is shut off but before the cartridge filter assembly is disengaged from the manifold assembly, thus, resulting in increased safety to the user.

In another aspect, representative filter assemblies of the present disclosure have the ability to at least essentially, if not totally, eliminate any potential for representative cartridge filter assemblies to unexpectedly disconnect from the representative manifold assembly during normal operation under typical operating conditions. Therefore, in some representative embodiments, the present disclosure incorporates representative locking tabs on the representative cartridge top assembly engaging mechanism that operatively interface with cooperative representative depressions on the representative manifold assembly engaging mechanism, providing a resistive force to this inherent disconnecting phenomenon. Furthermore, the representative locking tabs can be configured to permit the representative filter assembly to selectively disconnect should an increase in the filter assembly internal pressure occur that could damage the assembly or nearby objects. The design of these locking tabs can be modified to respond selectively to various levels of increased internal pressure conditions, as described further below.

During installation or removal of a water filter, such as from a point-of-use water filtration system, the user applies force such as, for example, rotatable or slidable force, to the filter housing. In some representative embodiments, interconnection ramps located on the filter end cap are configured to interface with an internal ramp assembly of the water manifold such that the filter and manifold slidably engage or disengage at the ramp assemblies. As the filter and manifold engage or disengage, the molded engagement ramps on the filter end cap either come into contact or lose contact with a spring valve located in the unfiltered water flow channel of the manifold depending upon whether a filter is being installed or removed. The molded tabs operatively located on the manifold prevent disconnection and separation of the filter from the manifold until essentially the entire length of the filter end cap interconnection ramp has been traversed. By appropriately, sufficiently sizing the length of the interconnection ramp in comparison to the engagement ramp, during disconnection, the water filter assembly is allowed to vent and attain pressure equilibrium with the external environment before the filter and manifold have been completely separated. In some representative embodiments, the engagement ramp, being shorter than the interconnection ramp, results in a break in the fluid circuit thereby resulting in the release of any pressure energy stored in the filter through venting of the filter to the ambient atmosphere. Because pressure equilibrium is reached while the locking tabs are still engaged, there is no longer energy available that could lead to the rapid and violent separation of the components during the disconnection process, thereby leading to increased safety for the system user.

In another representative aspect, the present disclosure describes a representative cartridge filter and a representative filter manifold comprising ramp-like interconnection members having multiple stages. For example, the interconnection members for both the cartridge filter and the filter manifold can take the form of ramps having multiple angled portions and multiple substantially horizontal portions wherein the angled portions serve to transition the cartridge filter and the filter manifold between different stages of connection while the horizontal portions serve to provide stable connection configurations, in which one stable configuration prevent physical detachment of the filter manifold and cartridge filter while venting the cartridge filter to the ambient pressure. However, other representative embodiments with rotational engagement or slidable engagement can provide desired venting with a two-stage engagement.

In another representative aspect, the present disclosure describes a representative filter assembly for filtering water from an external source, the filter assembly including a representative manifold assembly mountable to a representative appliance and being in fluid communication with the external water source and a representative cartridge assembly, the cartridge assembly being replaceable fluidly connectable to the manifold assembly by means of a hot disconnect that prevents rapid, unintentional and violent disengagement of the cartridge assembly from the manifold assembly. The manifold assembly is operably fluidly connectable at an inlet to a water source to be filtered and has a filtered water outlet and operative connecting members for removably connecting to the cartridge top member and has a mounting means attached to the manifold providing rotational travel to the cartridge top member for installation, removal and replacement of the cartridge filter.

According to present disclosure, representative adapters can be used to introduce desired attachment functions to an existing representative manifold. With the use of an adapter, the existing manifold is connected to an effective manifold for operatively coupling to a filter cartridge. Thus, a desired representative filter cartridge can be attached to the resulting effective manifold at the adapter such that the operatively connected filter cartridge and effective manifold, formed from the adapter connected to the existing manifold, can have various desired engagement and disengagement functionalities, such as venting and/or a two-stage engagement mechanism. In some representative embodiments, a representative cartridge top member operatively connects with the representative filter cartridge and has a fluid inlet, the inlet being fluidly communicable with the filter cartridge and being in fluid communication with an adapter assembly valve and further having a sealing means, the sealing means isolating an inlet flow of unfiltered water to the filter cartridge from a non-wetted portion of the manifold assembly and having a cartridge coupler fluid outlet, the outlet being fluidly communicable with a filter cartridge outlet and being in fluid communication with the manifold coupler outlet and further having sealing means, the sealing means isolating an inlet flow of unfiltered water to the filter cartridge from an outlet flow of filtered water from the filter cartridge.

In another representative aspect, the present disclosure is directed to a cartridge assembly and additionally a method of disengaging the cartridge assembly from a manifold assembly.

In yet another representative aspect, the present disclosure is directed to a filtration assembly comprising a cartridge filter and a manifold assembly. Both the cartridge filter and the manifold assembly can comprise engagement members defined by alternating horizontal and angle portions wherein the angled portions promoted attaching and withdrawing the cartridge filter from the manifold assembly and wherein the horizontal portions retainingly interface to prevent premature disconnecting of the cartridge filter from the manifold assembly.

BRIEF DESCRIPTION OF THE DRAWINGS

FIG. 34 is a side view of a multiple-stage ramp engagement mechanism in a disconnected orientation.

FIG. 35 is a side view of the multiple-stage ramp engagement mechanism of FIG. 34 in a first partially-engaged orientation.

FIG. 36 is a side view of the multiple-stage ramp engagement mechanism of FIG. 34 in a second partially-engaged orientation.

FIG. 37 is a side view of the multiple-stage ramp engagement mechanism of FIG. 34 in a third partially-engaged orientation.

FIG. 38 is a side view of the multiple-stage ramp engagement mechanism of FIG. 34 in a fully engaged orientation.

DETAILED DESCRIPTION OF THE DRAWINGS

Figure 1:
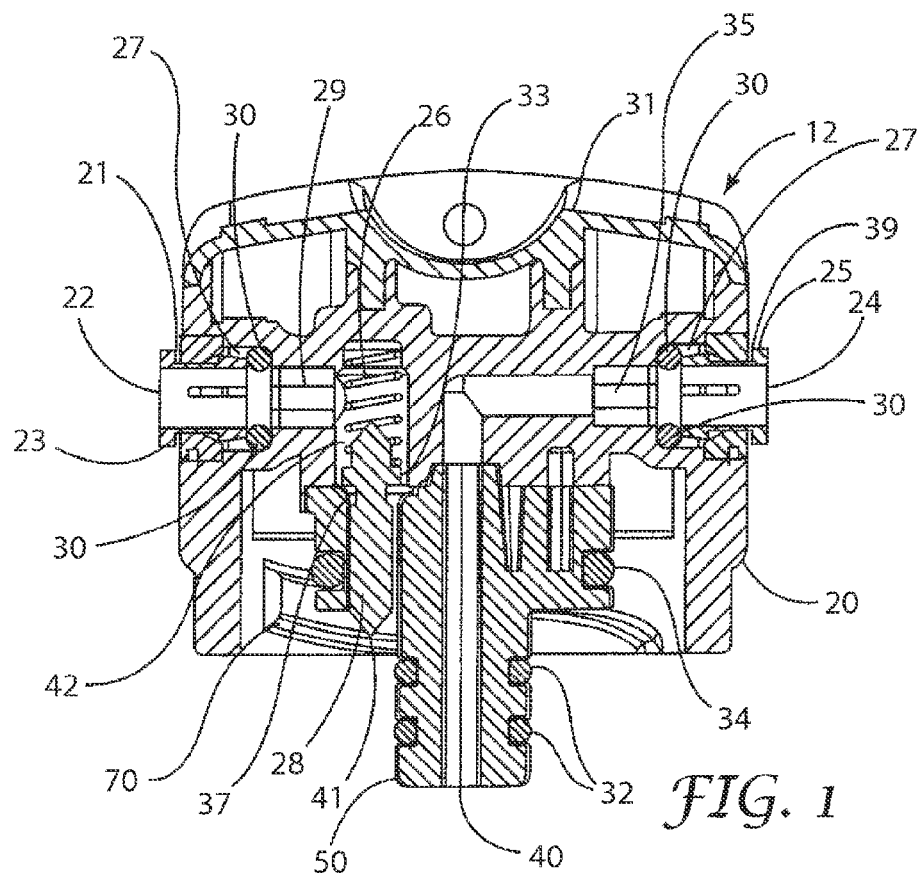
FIG. 1 is a sectional view of the manifold assembly member of the present disclosure taken through the inlet and outlet ports.
Figure 2:
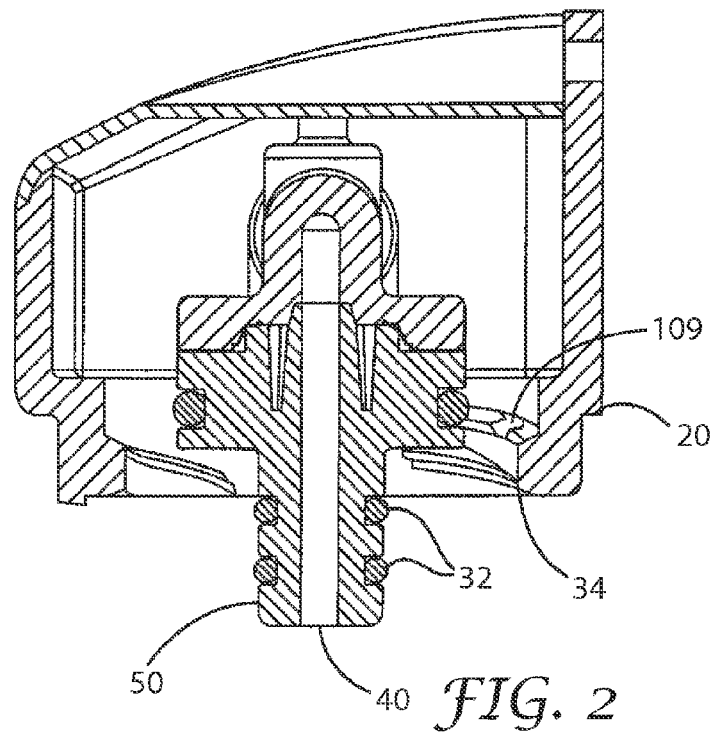
FIG. 2 is a sectional view of the manifold assembly member of the present disclosure taken perpendicular to FIG. 1.

A representative filter assembly or point-of-use water filtration system of the present disclosure is shown generally at 10 in the figures. The filter assembly 10 has two major components: a manifold assembly 12 and a cartridge assembly 14. The cartridge assembly 14 further comprises three subcomponents: cartridge top member 16, cartridge housing 18, and filter element 19.

As illustrated in FIGS. 1, 2, 3, and 4, the manifold assembly 12, presently preferably, includes a general manifold body 20. Inlet cartridge fitting 23 is, presently preferably, press-fit into inlet bore 21 of manifold assembly body 20, forming inlet port 22. A gap 27, illustrated in FIG. 1, is, presently preferably, formed between inlet bore 21 and inlet cartridge fitting 23. Inlet port 22 is sealed from gap 27, presently preferably, by means of O-ring 30 or the like. Inlet port 22 narrows into tubular inlet flow passage 29. Inlet flow passage 29 leads to valve well 42. Valve well 42 is, presently preferably, positioned to accept, presently preferably, both high-flow valve 28 and biasing spring 26. Valve well 42 is fluidly operatively connected to inlet bore 52 of cartridge insert 50 (see FIG. 3). High-flow valve 28 is seated in and also longitudinally translates within valve well 42. Inlet bore 52 has an annular surface 37 upon which ridge 33 of high-flow valve 28 sits to create a water-tight seal when biasing spring 26 is decompressed.

Figure 3:
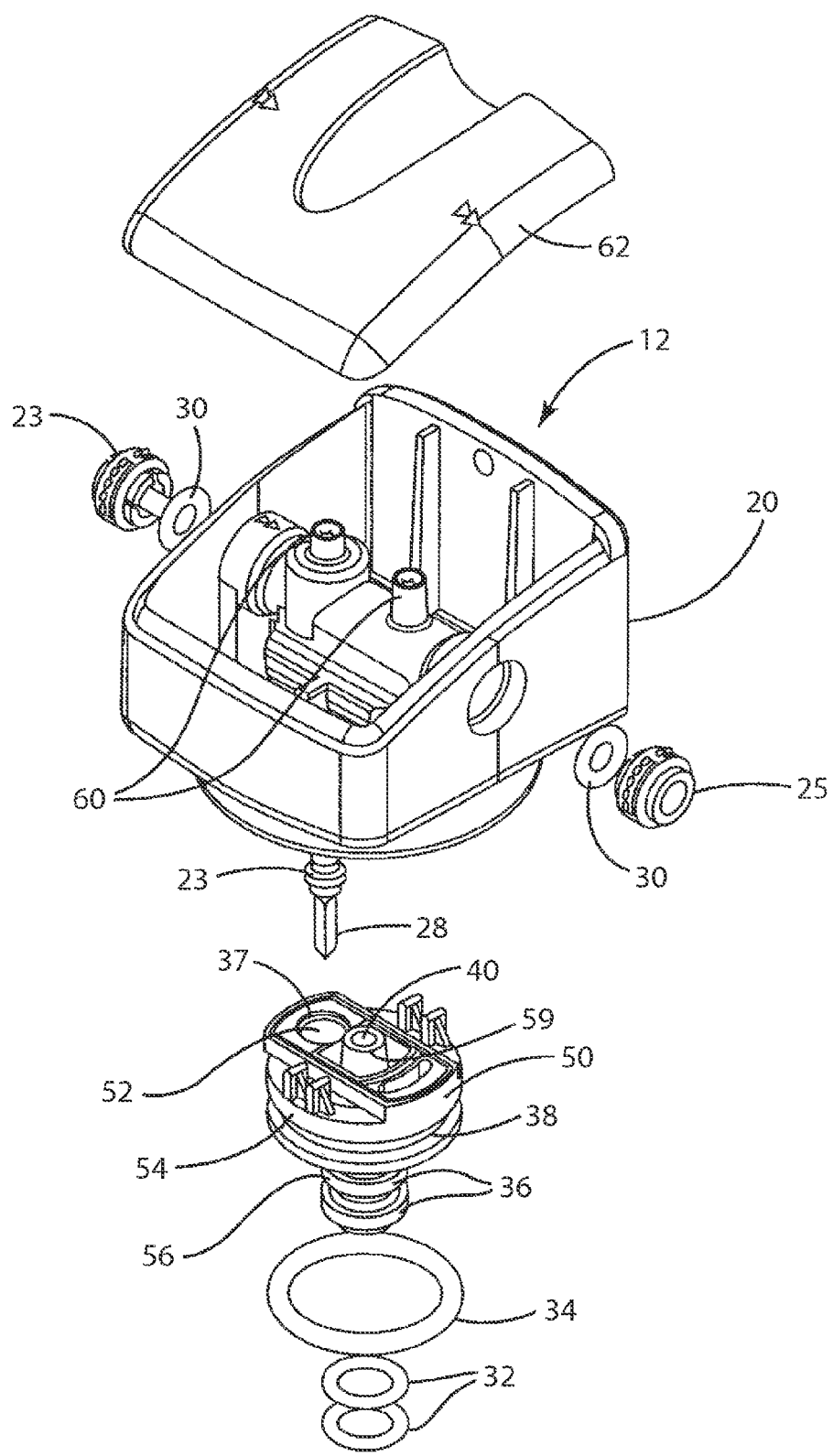
FIG. 3 is an exploded perspective view of the manifold assembly.
Figure 4:
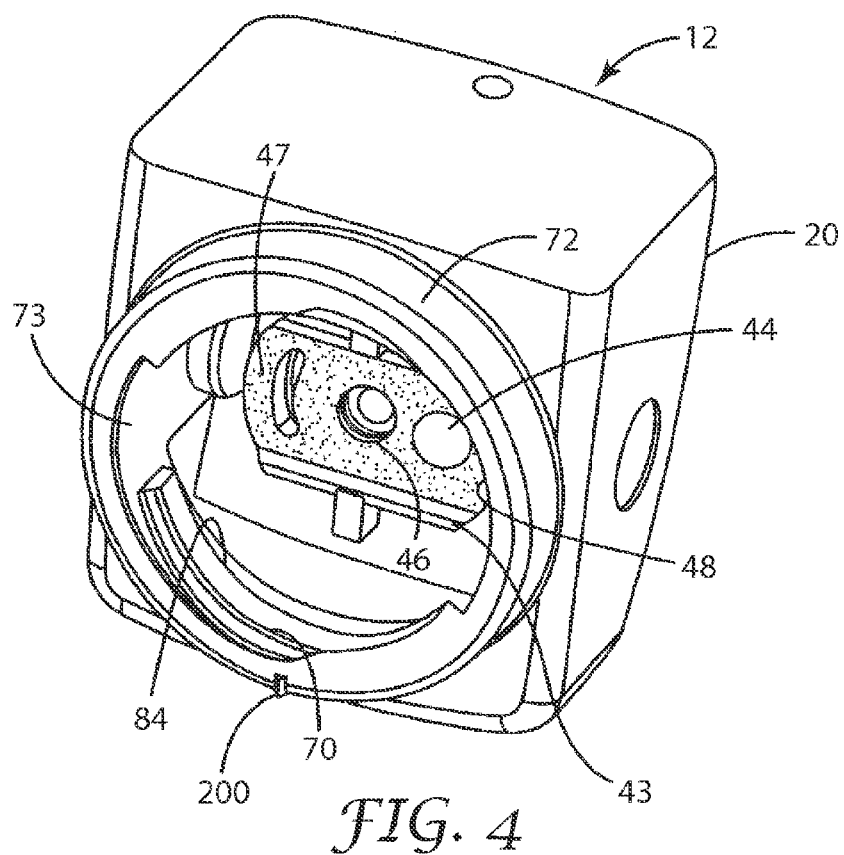
FIG. 4 is an underside perspective view of the manifold assembly.
Figure 5:
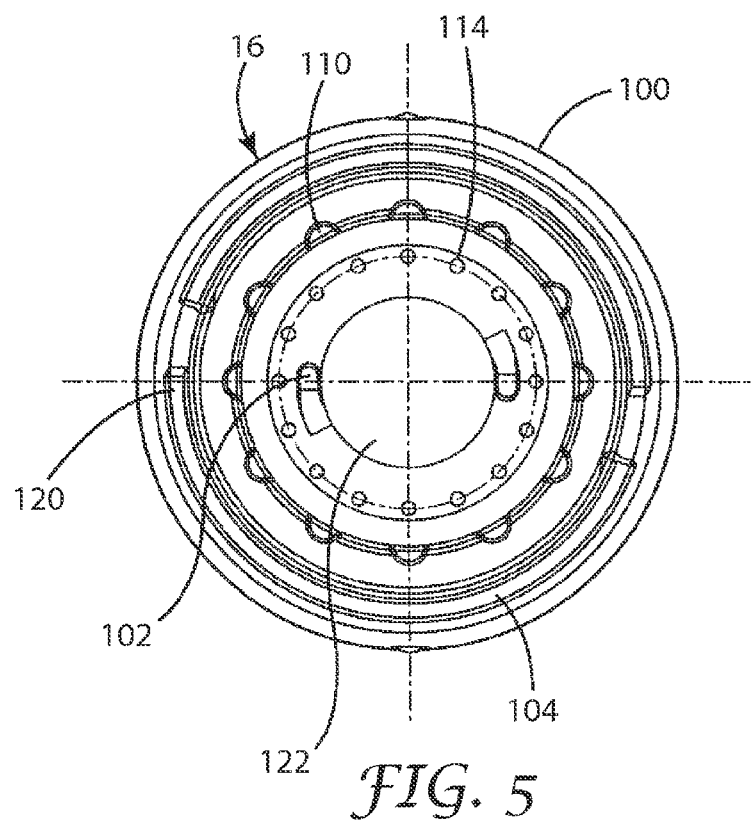
FIG. 5 is a plan view of the cartridge top member.

From FIG. 3, cartridge insert 50 has two main sections, an expanded upper body portion 54 and a second reduced body portion 56. Body portion 56 has a significantly reduced diameter when compared to the diameter of upper body portion 54. Cartridge insert 50 is, presently preferably, fixedly operatively connected to base assembly 43 of manifold assembly 12 at sealing surface 47, as shown in FIG. 4. Cartridge insert 50 and base assembly 43 are, presently preferably, sealed therein by gasket 48 or the like, which separates pressurized inlet and outlet water from the cavity of manifold assembly body 20. The base assembly 43 is operatively connected with cartridge insert 50 and, presently preferably, fluidly operatively connects outlet 44 of manifold assembly 20 with inlet bore 52 of cartridge insert 50, as well as inlet 46 of manifold assembly 20 with outlet bore 40 of cartridge insert 50.

Expanded upper body portion 54 includes groove 38. Groove 38 comprises a seal 34, presently preferably an O-ring, for sealing pressurized water from within receiver well 106 of cartridge top member 16 (shown in FIG. 6 and described below) from the cavity of general manifold body 20. Reduced body portion 56 further includes a pair of grooves 36. These grooves 36 are situated in series and hold seals 32, preferably being O-rings, to separate unfiltered inlet water within receiver well 106 from filtered outlet water. Reduced body portion 56 also has bored through its longitudinal center outlet bore 40 for conveying filtered outlet water from cartridge assembly 14.

Turning now to FIG. 3, outlet bore 40 continues through expanded upper body portion 54 by, presently preferably, means of a conical projection 59 within which filtered outlet water flows. Conical projection 59 has, presently preferably, a wider diameter at its base than its peak, the base therefore, presently preferably, narrowing to its point of fluid coupling with outlet flow passage 31. Outlet bore 40, presently preferably, retains a constant inside diameter flow path. From FIG. 1, flow passage 31 has an approximate 90.degree. turn leading to outlet flow passage 35. As before, outlet port 24 is, presently preferably, formed from the press-fitting of outlet cartridge fitting 25 into outlet bore 39 of manifold assembly body 20. A similar sealing means of an O-ring 30 is, presently preferably, employed to seal the subsequent gap 27 formed between outlet cartridge fitting 25 and outlet bore 39.

Manifold assembly 12 further has a top manifold hood 62 attached to manifold assembly body 20 using manifold hood connectors 60 as shown in FIG. 3.

Referring to FIG. 4, the underside of manifold assembly body 20, presently preferably, has protruding therefrom cartridge receiver 72 for operatively connecting with cartridge top member 16. The operatively connecting mechanism between cartridge receiver 72 and cartridge top member 16 is, presently preferably, through interior helical tabs 70 located on the inside margin 73 of cartridge receiver 72. Tabs 70 are, presently preferably, diametrically opposed on inside margin 73. These tabs 70, presently preferably, extend flush from the bottom surface of receiver 72 and, presently preferably, spiral upward at an approximate 8.degree. angle along margin 73 to a position, presently preferably, less than half the circumference away from their point of origin. The top surface 74 of these tabs 70, presently preferably, provides the supporting structure for and, presently preferably, operatively connects with external helical tabs 104 of cartridge top member 16, shown in FIG. 6 and described below.

Figure 6:
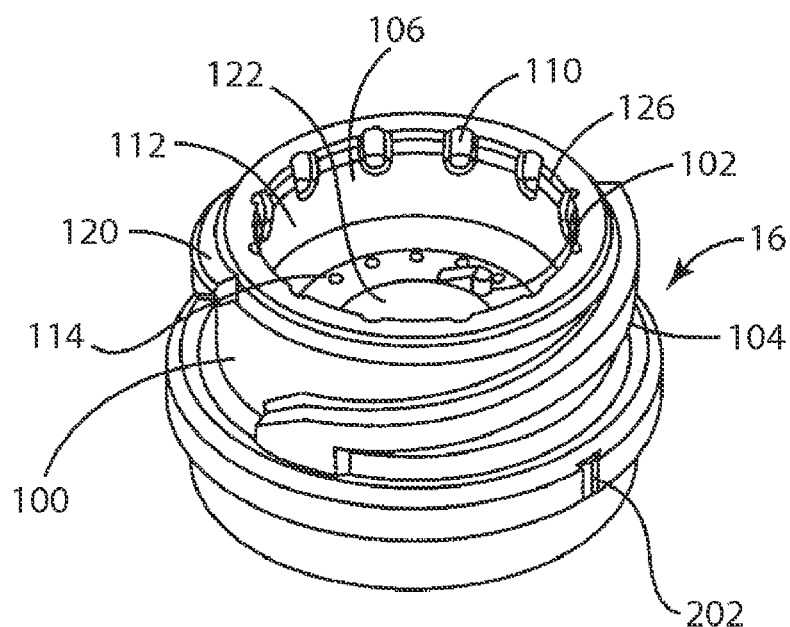
FIG. 6 is a perspective view of the cartridge top member, topside.
Figure 7:
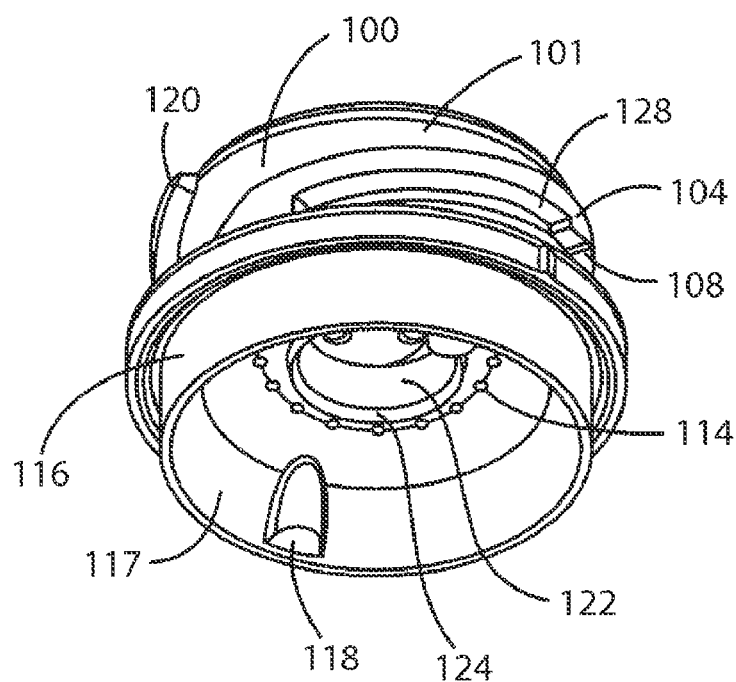
FIG. 7 is a perspective view of the cartridge top member, underside.

Turning now to FIGS. 6 and 7, cartridge top member 16, presently preferably, includes member body 100. Member body 100, presently preferably, has a margin 101 from which exterior helical tabs 104 operatively connect with interior helical tabs 70 of cartridge receiver 72. As with interior helical tabs 70, exterior helical tabs 104, presently preferably, spiral upward, presently preferably, at an approximate 8.degree. angle along margin 101 to a, presently preferred, position less than half the circumference away from their point of origin. The underside surface 128 of these tabs is, presently preferably, supported by top surface 74 of interior helical tabs 70 of manifold assembly 12, shown in FIG. 4. As can be seen in FIGS. 6 and 7, exterior helical tabs 104, presently preferably, have at their end points ramps 120 for facilitating engagement with interior helical tabs 70.

Cartridge top member body 100 has, presently preferably, defined therein interior receiver well 106 with inside margin 112 for sealing with O-ring 34 of manifold assembly 12 as shown in FIG. 1. This effects a fluid seal between unfiltered inlet water within receiver well 106 and the cavity of manifold assembly body 20.

As illustrated FIGS. 5, 6, 7, and 8, a plurality of inlet orifices 114 are, presently preferably, formed within the bottom surface of receiver well 106. These orifices 114 are, presently preferably, spaced circumferentially and equidistant from each other, although other spacing and numbers of orifices can be used, as would be understood by one skilled in the art. A distinct feature of these orifices 114 is that the inside diameter of any individual orifice is designed such that the adhesive forces between the inside surface and any remaining water within that orifice, presently preferably, allow for capillary action to prevent dripping when the cartridge assembly 14 is disengaged from the manifold assembly 12. These orifices 114, presently preferably, direct inlet water to cartridge housing 18.

Outlet bore 122 is, presently preferably, bored through the center of cartridge top member 16. Within outlet bore 122 reduced body portion 56 of cartridge insert 50 is, presently preferably, engaged for conveyance of filtered water. A lip 124, presently preferably, protrudes from the underside of outlet bore 122, providing proper positioning of filter 19 within cartridge assembly 14. Dual ramps 102, presently preferably, extend upward from the bottom of receiver well 106. One or the other of the ramps 102, presently preferably, radially aligns with high-flow valve 28 contact surface 41 to compress and open the valve 28 when cartridge top member 16 is, presently preferably, rotatably moved into place to operatively connect with manifold assembly 12.

The underside surface 128 of each helical tab 104, presently preferably, has a locking tab 108 for, presently preferably, operatively connecting with a cooperative depression 109 located in interior helical tab 70 of manifold assembly 12. As will be seen, these locking tabs 108, presently preferably, interface with depressions 109 during engagement of cartridge assembly 14 with manifold assembly 12 to lock the cartridge assembly 14 in place and to provide a degree of burst protection to the components of filter assembly 10, i.e. to resist unexpected disconnection of the cartridge assembly 14 from the manifold assembly 12. The locking tabs 108 will, presently preferably, disengage from the respective depressions 109, presently preferably, permitting the cartridge assembly 14 to back off from manifold assembly 12 at a predefined level of hydraulic pressure for the benign disengagement thereof.

Without locking tabs 108, normal pressure levels of the incoming water service and associated vibrations would slowly cause the cartridge assembly 14 to disconnect from manifold assembly 12, resulting in leakage and the eventual total disengagement of the cartridge assembly 14 from the manifold assembly 12. One unique feature, among others, of locking tabs 108 in the representative embodiment of the Figures, is that they can be designed such that they do not allow for this gradual disconnecting of the filter assembly under normal line pressure conditions and within normal line pressure tolerances, but will commence disconnecting at a certain pressure condition below the structural strength limits of the filter assembly. Generally, normal line pressure conditions range from about 20 psig to about 120 psig. In this representative embodiment and in other representative embodiments such as those described below, the filters can be designed to disconnect at pressures above about 120 psig, and in other presently preferred embodiments at pressures above a value from about 150 psig to about 180 psig. A person of ordinary skill in the art will recognize that additional ranges of pressure values within these explicit pressure ranges are contemplated and are within the present disclosure. The design of the locking tabs 108, presently preferably, determines this pressure condition by being a more aggressive design, such as with deeper depressions 109, or a less aggressive design, such as with shallower depressions 109, a more aggressive design seating more firmly in the depression 109 and requiring greater pressure relative to less aggressive designs to unseat the locking tabs 108 from the depressions 109.

Referring to FIGS. 4 and 6, manifold assembly 12 and cartridge top member 16, presently preferably, have alignment markers, 200 and 202 respectively, to indicate alignment of both components and engagement of locking tabs 108.

As illustrated in FIG. 7, the cartridge top member 16, presently preferably, has a margin 116 extending circumferentially from body 100. The interior face 117 of surface 116, presently preferably, progressively slopes centerward to inlet orifices 114. This slope allows for a smoother transition and flow pattern from the interior space within surface 116. Also on the interior face 117 are, presently preferably, two weld facilitators 118. The weld facilitators 118 are, presently preferably, diametrically opposed from each other.

Figure 8:
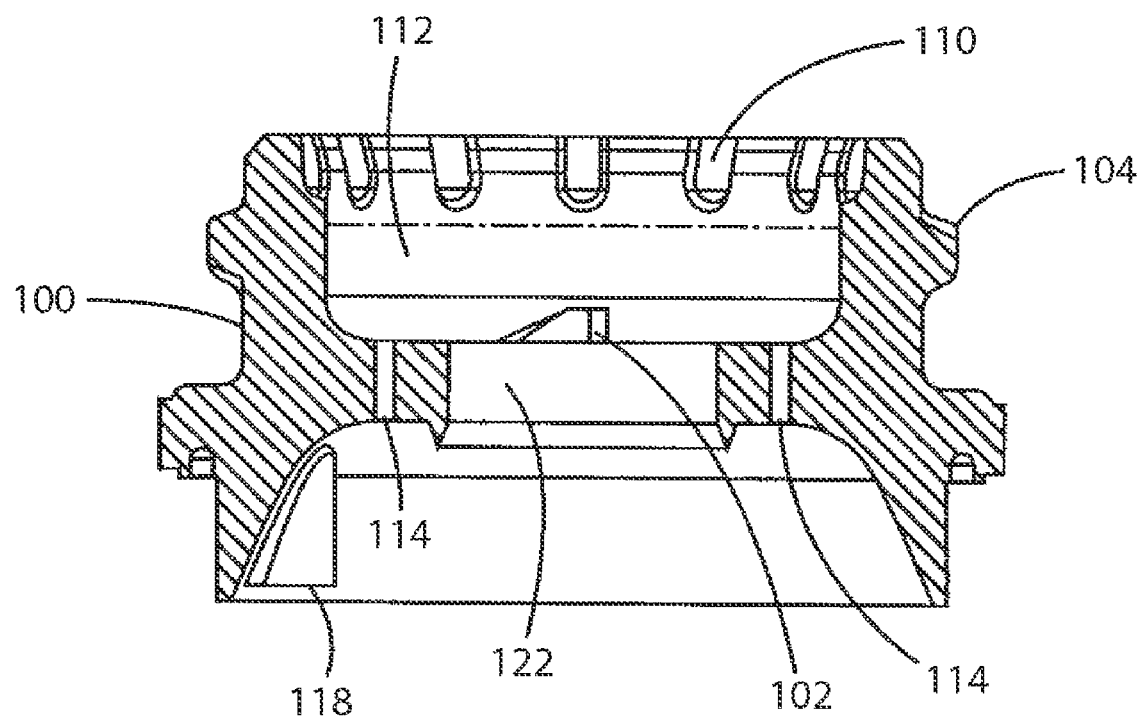
FIG. 8 is a cross sectional view of the cartridge top member taken through its center.

As illustrated in FIGS. 6 and 8, defined around the perimeter of upper sealing surface 112 of receiver well 106 are, presently preferably, a plurality of vent ports 110. Vent ports 110 are, presently preferably, spaced equidistant around the diameter of sealing surface 112. These vent ports 110, presently preferably, separate the surface 112 from the interior cavity of manifold assembly body 20, as shown in FIG. 1. As will be seen, these vent ports 110, presently preferably, allow for relief of pressure trapped in the cartridge assembly 14 before complete disengagement during the disassembly of cartridge assembly 14 from manifold assembly 12. The top edge 126 of receiver well 106 is, presently preferably, chamfered to facilitate this relief of pressure.

Figure 9:
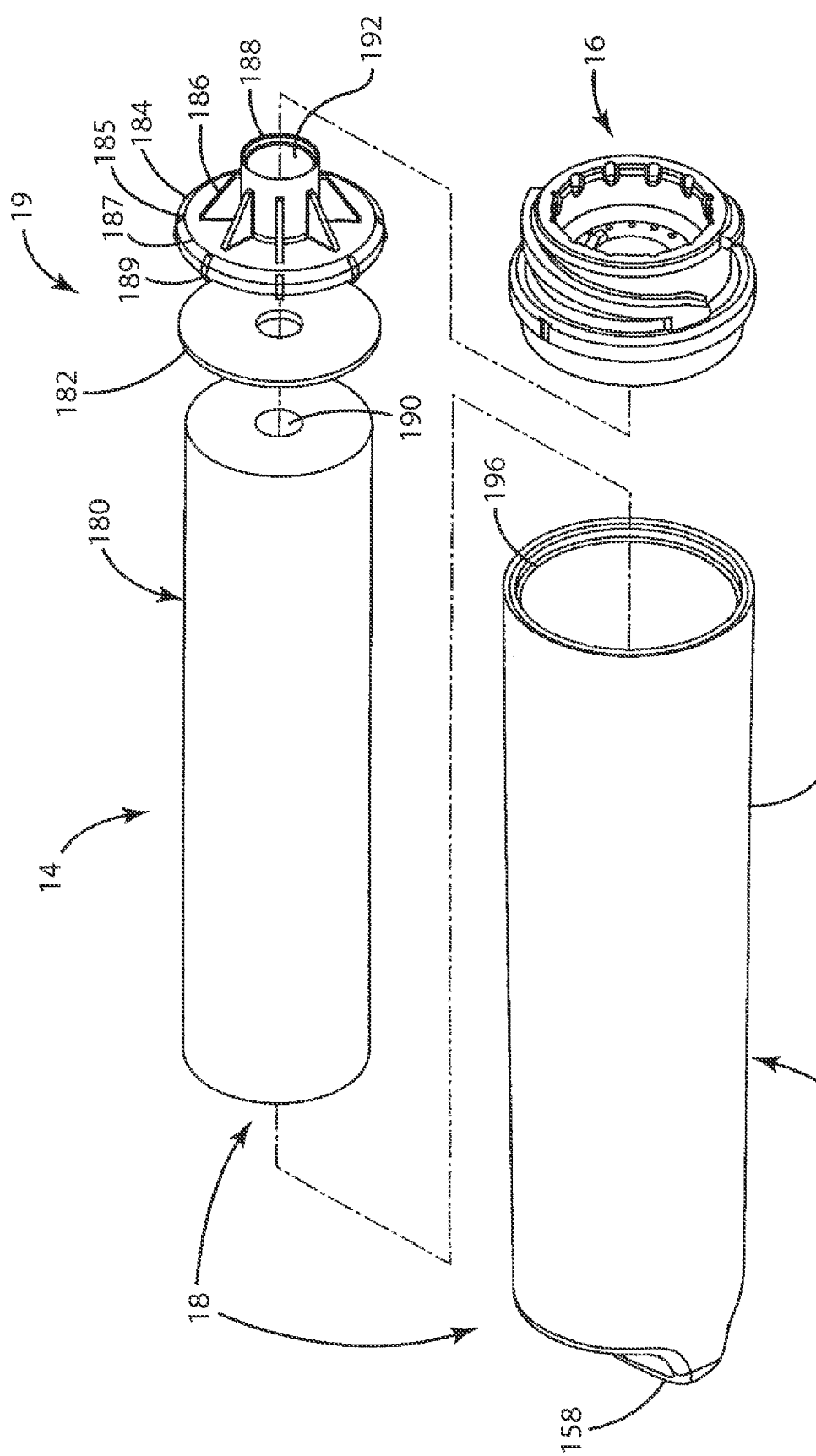
FIG. 9 is an exploded perspective view of the cartridge assembly.
Figure 10:
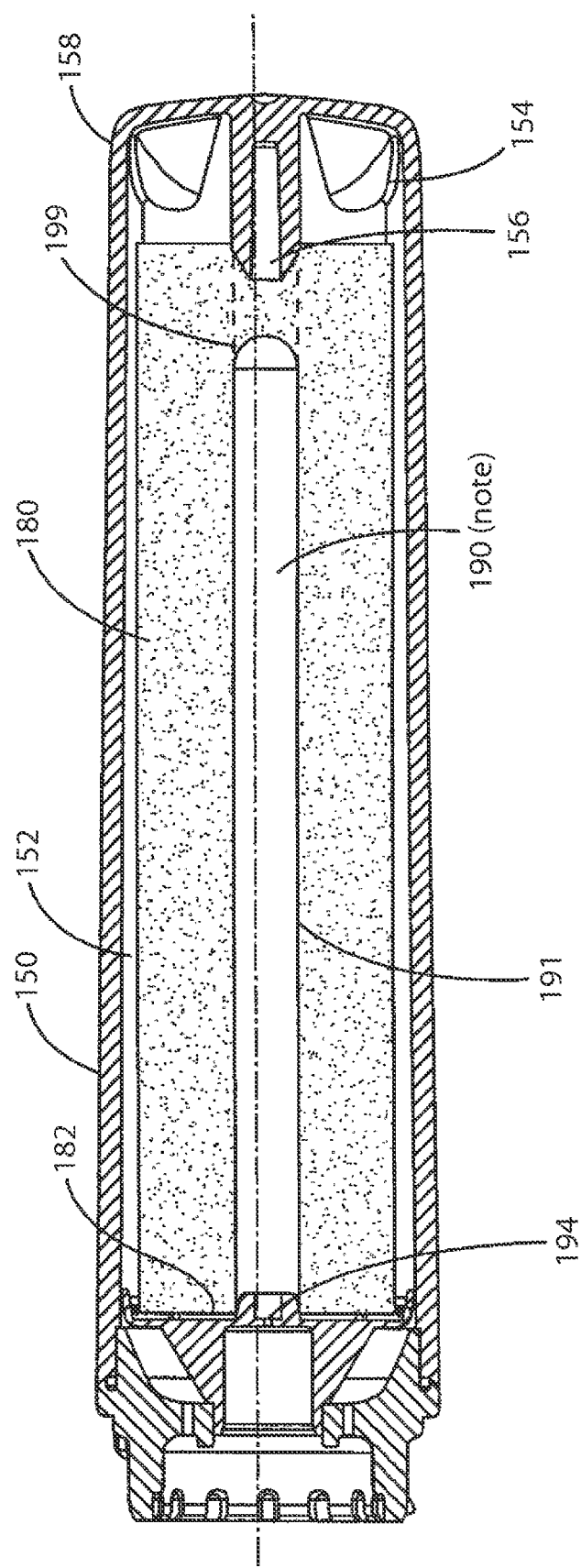
FIG. 10 is a side elevational sectional view of the cartridge assembly.

Turning now to the representative cartridge housing assembly 18 as shown in FIGS. 9 and 10, cartridge housing assembly 18, presently preferably, comprises cartridge housing body 150 and its components as well as filter assembly 19. Cartridge housing body 150 is, presently preferably, a cylindrical housing tapered at one end for insertion of filter assembly 19. Lateral supports 154, presently preferably, protrude inward from the narrow end and herein defined as bottom of body 150 for longitudinally supporting filter assembly 19 in place. Concentric and center to supports 154 is, presently preferably, an upward directed alignment projectile 156, also used to support and center filter assembly 19 within cartridge housing body 150. Handle 158 is, presently preferably, formed from the bottom of housing body 150 and is utilized, presently preferably, to assist in applying rotational force to cartridge assembly 14.

Filter 19 comprises, presently preferably, carbon filter 180 or other type filter. The carbon filter 180 is, presently preferably, made of activated carbon with roughly about one micron particle size in a binder. The carbon block forming the carbon filter 180 has, presently preferably, an inner margin 191 that defines an axial bore 190. The presently preferred representative embodiment of carbon filter 180 is a molded design as shown in FIG. 10 in which axial bore 190 does not, presently preferably, extend all the way through filter 180, but instead to a point in which a portion of filter medium, presently preferably, exists between the end of axial bore 190 and alignment projectile 156. With this design, the full exterior surface of filter 180 in fluid contact with the inlet water, presently preferably, serves as a filter medium.

Another representative alternative embodiment, presently preferably, comprises an extruded design in which axial bore 190 does extend all the way through carbon filter 180. The extruded design, presently preferably, necessitates an end dam on the bottom of carbon filter 180 to prevent unfiltered water migration into axial bore 190. The extruded embodiment is defined by dashed lines 199 extending through carbon filter 180, as shown in FIG. 10.

Figure 11:
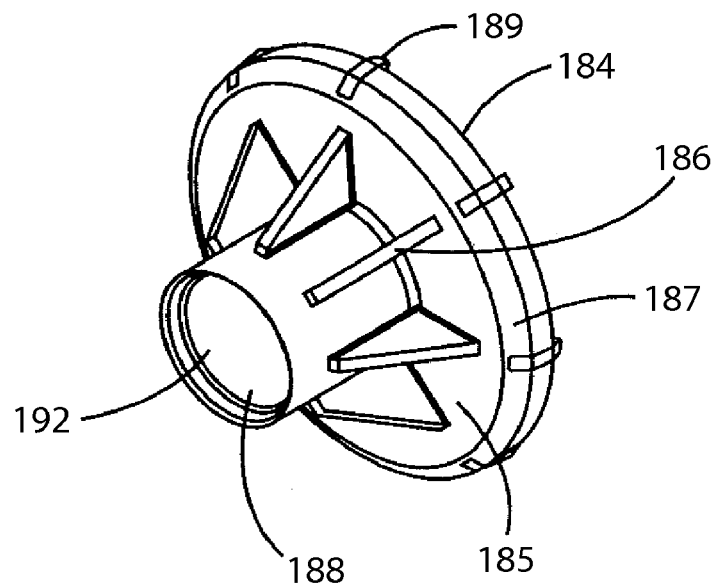
FIG. 11 is a perspective view of the cartridge filter glue dam.
Figure 12:
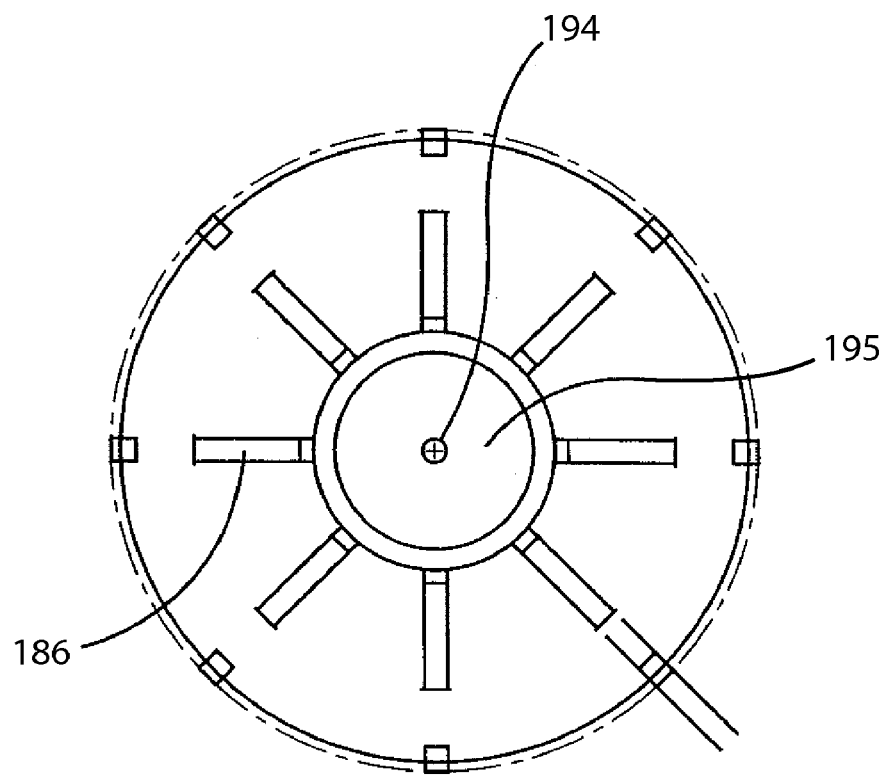
FIG. 12 is a plan view of the cartridge filter glue dam.
Figure 13:
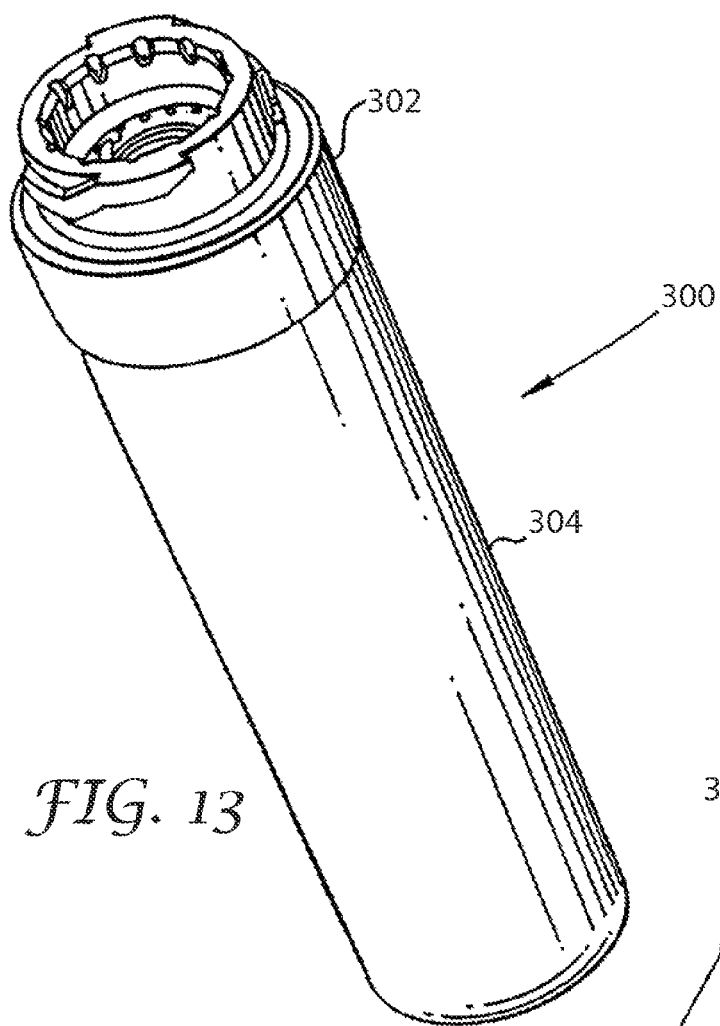
FIG. 13 is a perspective, cap-side view of an embodiment of a cartridge filter having a multiple stage attachment mechanism.
Figure 14:
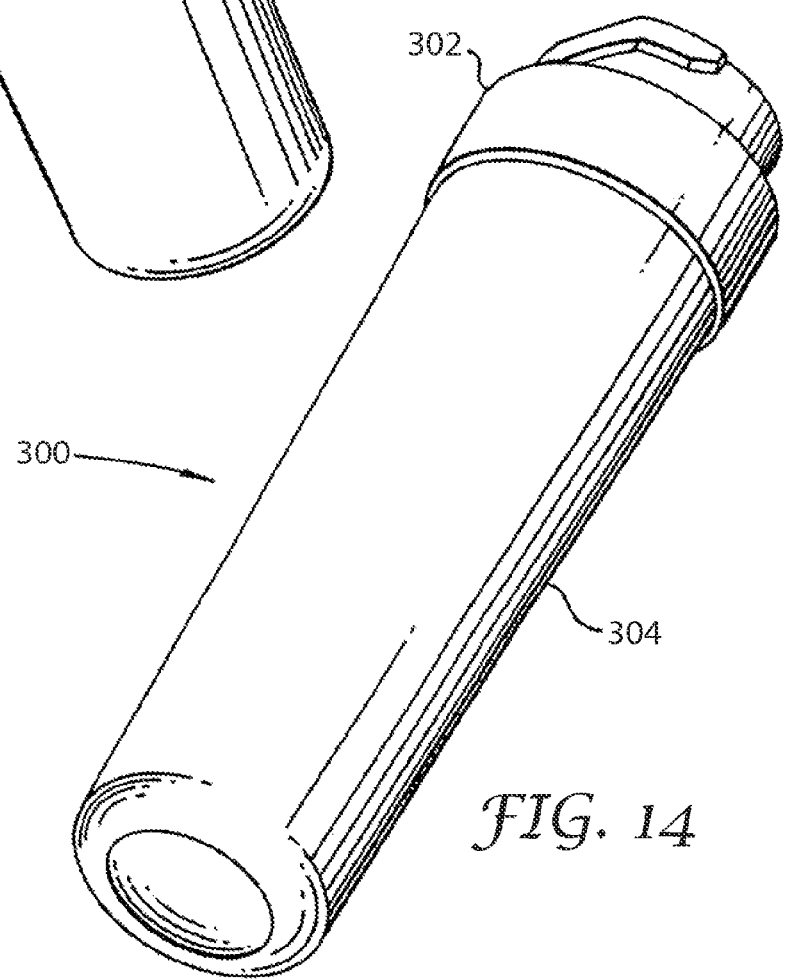
FIG. 14 is a perspective, base-side view of the cartridge filter of FIG. 13.

The outlet of filter element 19, presently preferably, comprises adhesive 182 and glue dam 184. As shown in FIGS. 11 and 12, glue dam 184 further consists of disc 185, supports 186, and outlet tube 188. Disc 185, presently preferably, has a diameter that is less than that of the inside surface of cartridge housing body 150, resulting in a flow path for unfiltered water to filter 180, shown as annular space 152 in FIG. 10. To facilitate the flow of water, the outer edge of disc 185 angles downward via outer edge 187.

Disc 185 further includes spacers 189, presently preferably, placed equidistant around outer edge 187, further defining the annular space available as a path for unfiltered water. Angled supports 186 are, presently preferably, spaced equidistant around the top face of glue dam 184 to brace outlet tube 188. The interior surface of outlet tube 188 is defined herein as sealing surface 192. Sealing surface 192 is sized to accept, presently preferably, O-rings 32 or the like as described above in FIG. 3 for the purpose of separating unfiltered inlet water from filtered outlet water. The bottom of sealing surface 192 is defined as outlet face 195. Within outlet face 195 is a bore defining outlet orifice 194, for operatively fluidly connecting filtered outlet water of filter bore 190 to outlet bore 40 of cartridge insert 50.

As shown in FIG. 9, cartridge top member 16 operatively connects with cartridge housing assembly 18 through the coupling of margin 116 with the inside surface 196 of cartridge housing 150.

In operation, from an external connection (not shown) unfiltered water flows through inlet port 22 of FIG. 1 to inlet flow passage 29 and into valve well 42. When manifold assembly 12 is not engaged with cartridge assembly 14, biasing spring 26 imparts a force upon high-flow valve 28, depressing it from valve well 42 into inlet bore 52 of cartridge insert 50. This effects a watertight seal at annular surface 37 between valve well 42 and inlet bore 52 of cartridge insert 50.

In coupling operation, manifold assembly 12 is engaged with cartridge assembly 14 and specifically, cartridge top member 16 as follows: Manifold assembly 12 is engaged with cartridge assembly 14 by matching up external helical tabs 104 of cartridge top member 16 with internal helical tabs 70 of manifold assembly 12, using a ramp 120 as an initial guide. The operatively connecting helical tabs 70, 104 will begin to engage the manifold assembly 12 with the cartridge assembly 14 when a rotational motion is imparted to the cartridge assembly 14 relative to manifold assembly 12. This rotational motion will translate into a longitudinal displacement of cartridge assembly 14 into manifold assembly 12, sealing both interior sealing surface 192 of outlet tube 188 on FIG. 8, as well as sealing surface 112 of cartridge top member 16.

When alignment marker 200 of manifold assembly 12 (see FIG. 4) is lined up with alignment marker 202 of cartridge top member 16 (see FIG. 6), then ramp 102 of cartridge top member 16 will have fully depressed high-flow valve 28 within valve well 42 of manifold assembly 12 against the compressive force of biasing spring 26. This allows inlet water to flow through as described above. The alignment of markers 200 and 202 also indicates that locking tabs 108 have engaged the depressions 109.

During normal engagement, as described below, the axial force imparted on high-flow valve 28 by ramps 102 of cartridge top member 16 translates through the body of valve 28, compressing biasing spring 26 and allowing inlet water to flow from inlet flow passage 29 through to receiver well 106 of cartridge top member 16.

Within receiver well 106, pressurized water is forced through inlet bores 114 (see FIG. 6) along interior surface 117 of FIG. 7 and guided around to the outer circumference of disc 185 and down outer edge 187 of FIG. 9. Flow proceeds into the annular space 152 defined between the exterior of filter 180 and the interior surface of cartridge housing 150 as shown in FIG. 10. Differential pressure between the exterior of filter 180 and axial bore 190 forces this inlet water from annular space 152 through the filter to axial bore 190. From bore 190, filtered water now flows through the flow restriction outlet orifice 194 through outlet bore 40 of cartridge insert 50 to outlet flow passage 31 of manifold assembly 12. From there, filtered water exits manifold assembly 12 through outlet flow passage 35 and out outlet port 24 to an external means connected thereto (not shown).

In an alternative embodiment, an adapter could be used to facilitate interconnection of the cartridge assembly 14 and the manifold assembly 12. Such an adapter would allow for the use of filter assembly components 10 not originally designed for use with one another.

The disengagement of manifold assembly 12 from cartridge assembly 14 proceeds as follows, under the definition that alignment marker 200 of manifold assembly 12 is lined up with alignment marker 202 of cartridge top member 16, at 0.degree. It should be noted that all relative rotational motion between manifold assembly 12 and cartridge assembly 14 also provides relative motion along the longitudinal axis. As rotational force is applied to cartridge assembly 14 to disengage it from manifold assembly 12, from 0.degree. to substantially 17.degree. from alignment, locking tabs 108 are unseated from depressions 109. Simultaneously, the compressive force of biasing spring 26 acts to close the high-flow valve 28 as the valve 28 rides down the ramp 102 (see FIG. 6). As valve 28 descends (longitudinal relative motion), ridge 33 approaches annular sealing surface 37. At substantially 17.degree. of rotation, biasing spring 26 has fully pressed ridge 33 of high-flow valve 28 into contact with annular sealing surface 37, thereby stopping the flow of inlet water to the cartridge assembly. As rotation proceeds, at substantially 34.degree. from alignment, sealing surface 112 will, presently preferably, begin to disengage longitudinally from O-ring 34, thus opening vent ports 110 to ambient and allowing vent ports 110 to relieve any excess pressure within cartridge assembly 14. As separation of cartridge assembly 14 from manifold assembly 20 advances, presently preferably, at approximately 120.degree. from alignment, cartridge assembly 14 will be free to fully disengage from manifold assembly 12.

Under normal conditions of system pressure and vibration, the existence of locking tabs 108 and depressions 109 will, presently preferably, necessitate the manual disengagement of manifold assembly 12 from cartridge assembly 14 as described above. However, upon an overpressure condition within the filter assembly, as defined by the level of aggressive design utilized in tabs 108 and depressions 109, internal pressure will, presently preferably, unseat locking tabs 108 from depressions 109 without the aid of external means, thereupon commencing the benign disengagement sequence as described above.

Figure 15:
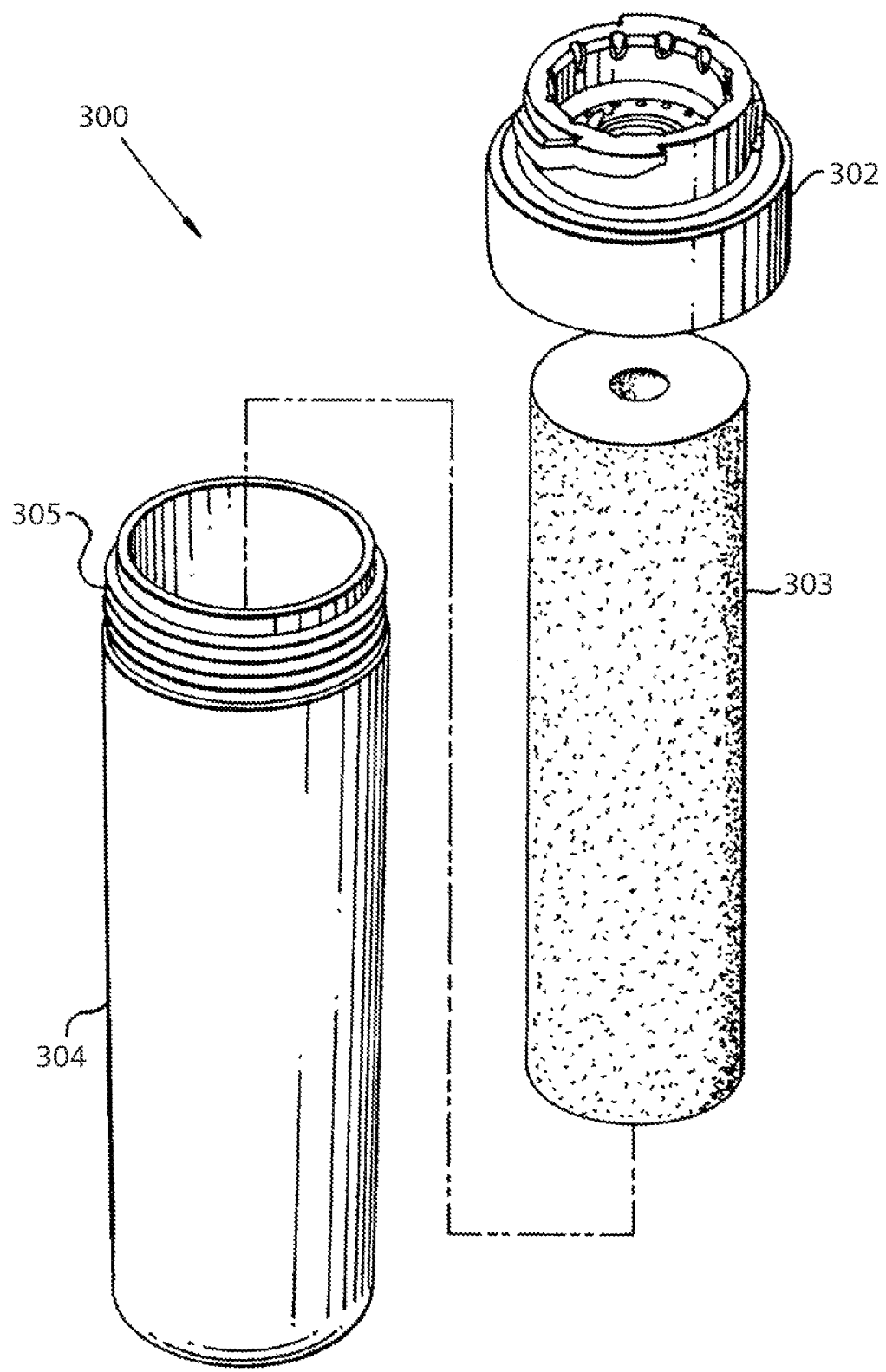
FIG. 15 is an exploded, perspective view of the cartridge filter of FIG. 13.
Figure 16:
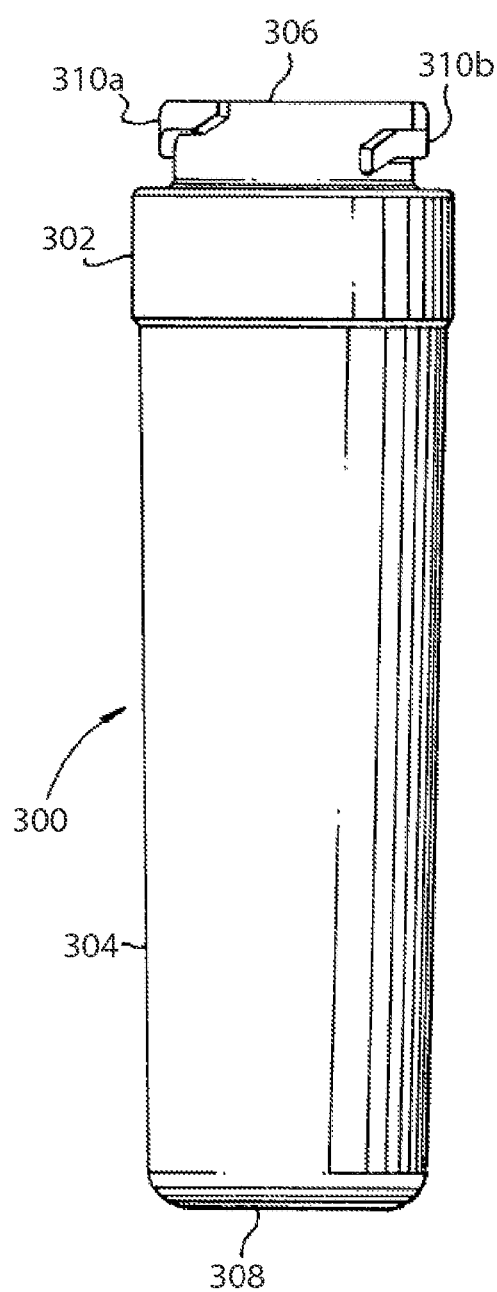
FIG. 16 is a side view of the cartridge filter of FIG. 13.
Figure 17:
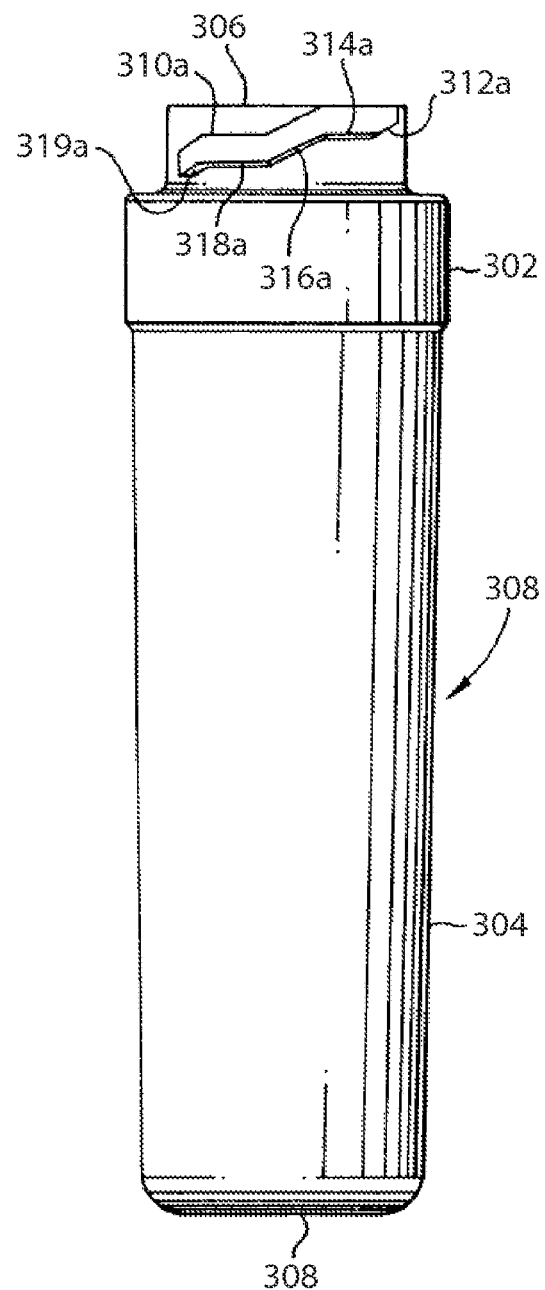
FIG. 17 is an alternative side view of the cartridge filter of FIG. 13.
Figure 18:
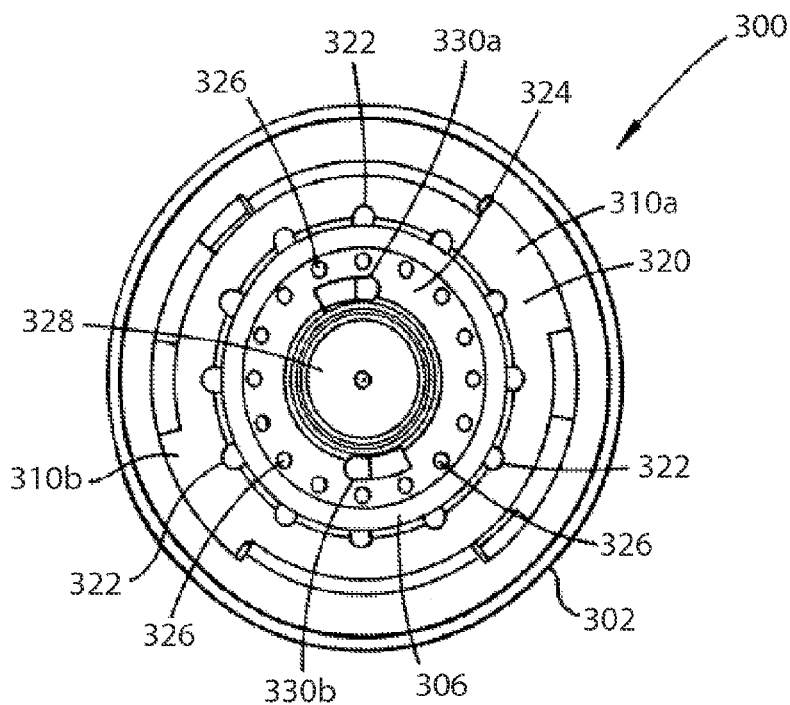
FIG. 18 is a cap-side end view of the cartridge filter of FIG. 13.
Figure 19:
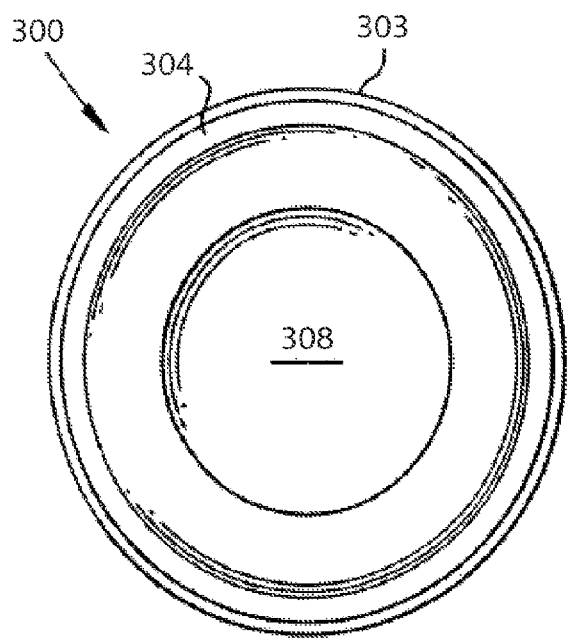
FIG. 19 is a base-side end view of the cartridge filter of FIG. 13.
Figure 20:
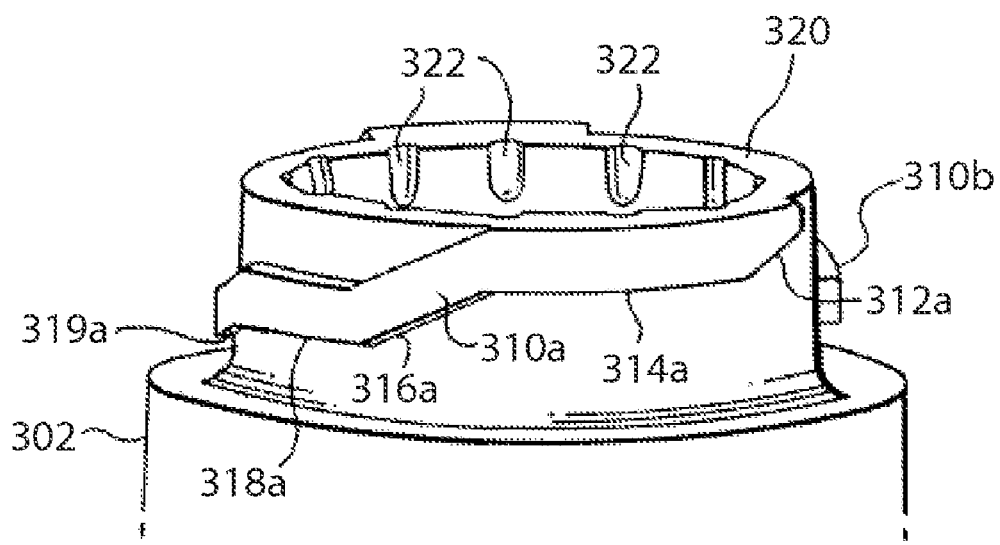
FIG. 20 is a fragmentary perspective view of the cartridge filter of FIG. 13 with an expanded view of a filter cap.
Figure 21:
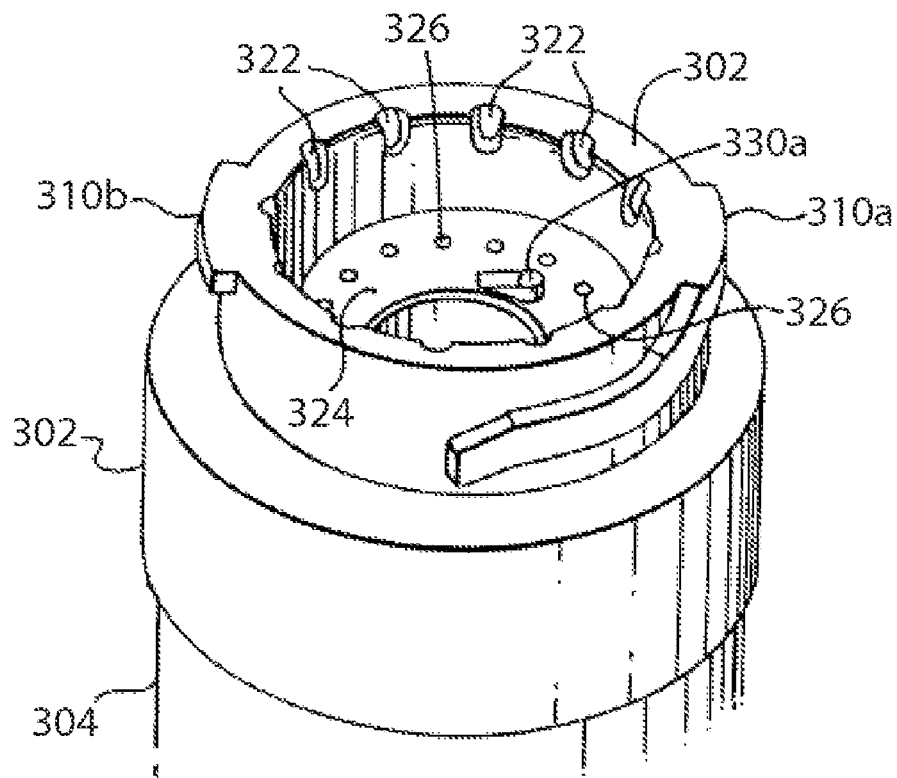
FIG. 21 is a cap-side perspective view of the filter cap of FIG. 20.
Figure 22:
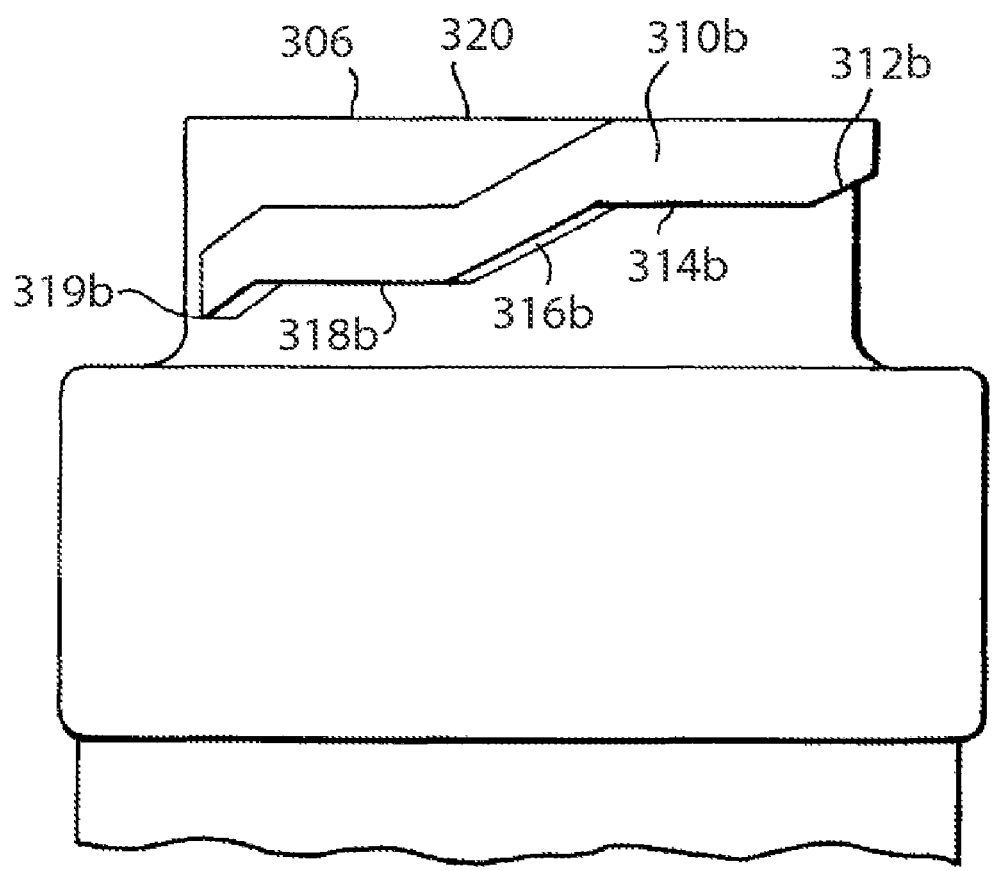
FIG. 22 is a fragmentary side view of the cartridge filter of FIG. 13 with an expanded view of the filter cap of FIG. 20.
Figure 23:
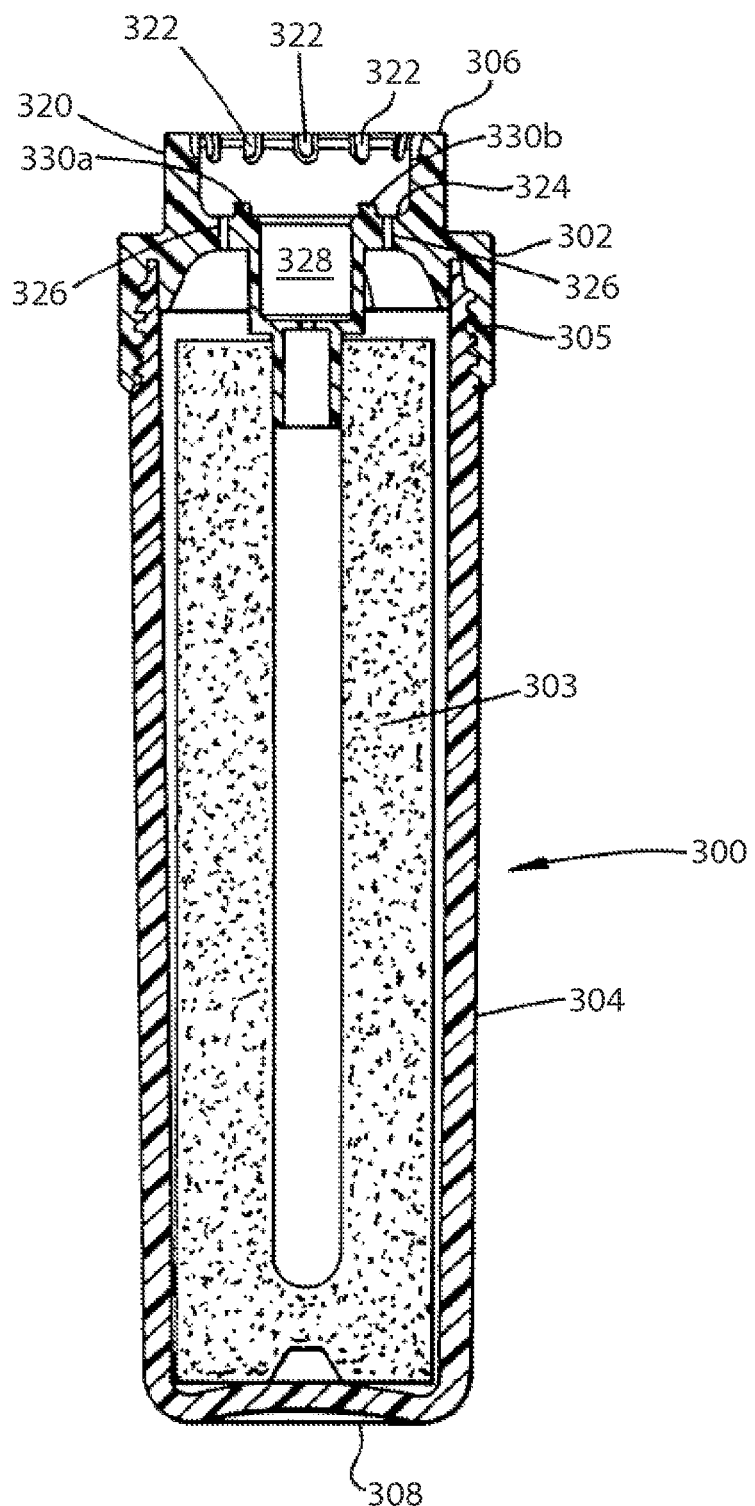
FIG. 23 is a section view of the cartridge filter of FIG. 13 in which the section is taken through the center of the cartridge.
Figure 24:
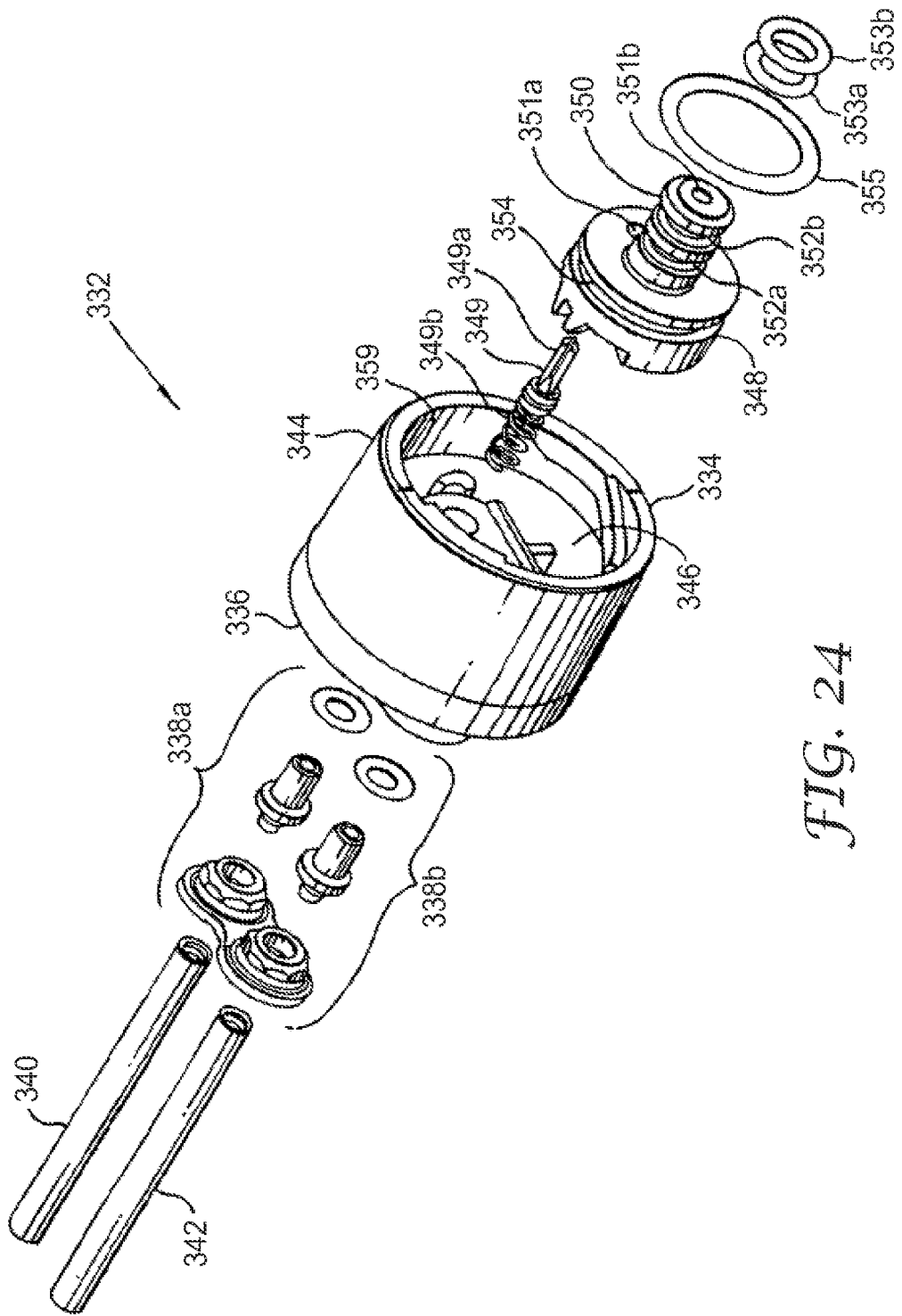
FIG. 24 is an exploded, perspective view of a distribution manifold.

Referring to FIGS. 13-23, a representative embodiment of a filter cartridge 300 comprising a filter cap 302, a filter media 303 and a filter body 304 is illustrated in which the filter cartridge can be used to compete a two stage engagement structure. Filter media 303 can comprise a wide variety of filtering medias for example depth filtration media, surface filtration media, sand filtration media, activated carbon filtration media, ion exchange filtration media, cross-flow membrane filtration media and hollow fiber filtration media. Filter cap 302 and filter body 304 can be fabricated of suitable polymeric materials such as polypropylene, polycarbonate or polyethylene. Alternatively, filter cartridge 300 can be fabricated from modified polyolefins such as, for example, metallocene modified polypropylene or polyethylene polymers and copolymers as well as either high or low density polyethylene polymers, having advantageous properties such as increased strength, elasticity or increased ultimate elongation percentages such as disclosed in U.S. patent application Ser. No. 10/377,022, published as U.S. Pat. Pub. No. 2004/0094468 A1, which is herein incorporated by reference to the extent not inconsistent with the present disclosure. In some embodiments, filter cap 302 may be constructed of a first polymer, such as polypropylene, having a specific quality such as, for example, strength or rigidity while filter body 304 is constructed of a second polymer having a different design quality such as, for example, increased ultimate elongation percentage or increased stretch, with suitable polymers being metallocene modified polypropylene or polyethylene polymers and copolymers as well as either high or low density polyethylene polymers. Filter cap 302 and filter body 304 are operatively joined using any suitable joining technique such as, for example, an engageable thread 305 as illustrated in FIG. 15 or other alternative joining techniques such as adhesives, heat welding, spin welding, ultrasonic welding and the Like. Filter cartridge 300 generally comprises an attachment end 306 and a handling end 308.

Filter cap 302 can comprise a pair of opposed and identically configured multi-stage filter attachment members 310a, 310b, for example attachment ramps as illustrated in FIGS. 13-23. As clearly illustrated in FIGS. 17, 20 and 21, multi-stage filter attachment member 310a can comprise a first angled portion 312a adjacent to the first horizontal portion, a first horizontal portion 314a facing toward the filter body, a second angled portion 316a adjacent to the first horizontal portion, a second horizontal portion 318a facing toward the filter body, and a third angled portion 319a adjacent to the second horizontal portion while correspondingly, multi-stage filter attachment member 310b can comprise a first angled portion 312b, a first horizontal portion 314b, a second angled portion 316b, a second horizontal portion 318b and a third angled portion 319b.

As clearly illustrated in FIGS. 18, 20, 21 and 23, filter cap 302 comprises a projecting insertion wall 320. A plurality of venting notches 322 is spaced about the inner rim of the insertion wall 320, although a single vent or a different number of venting notches can be used relative to the venting notches shown in the Figures. Filter cap 302 further comprises an interface surface 324 having a plurality of feed throughbores 326 and a return throughbore 328. As illustrated, interface surface 324 can further comprise a pair of arcuate kick-off ramps 330a, 330b.

Figure 25:
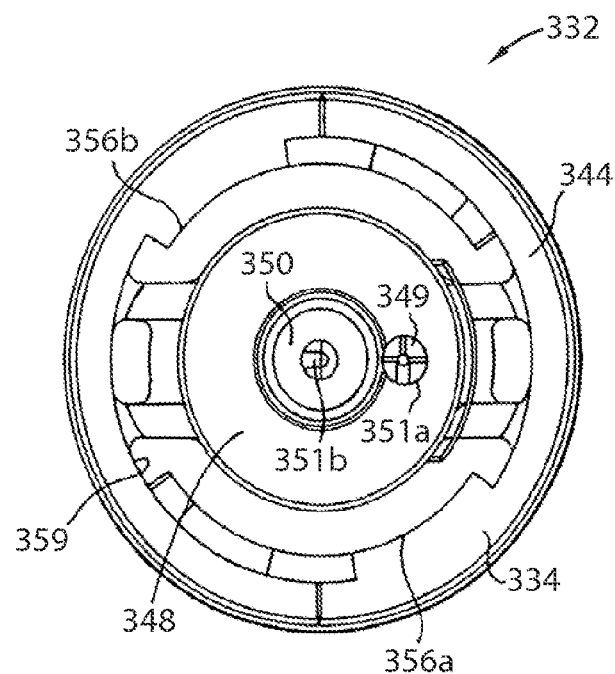
FIG. 25 is a filter-connection end view of the distribution manifold of FIG. 24.
Figure 26:
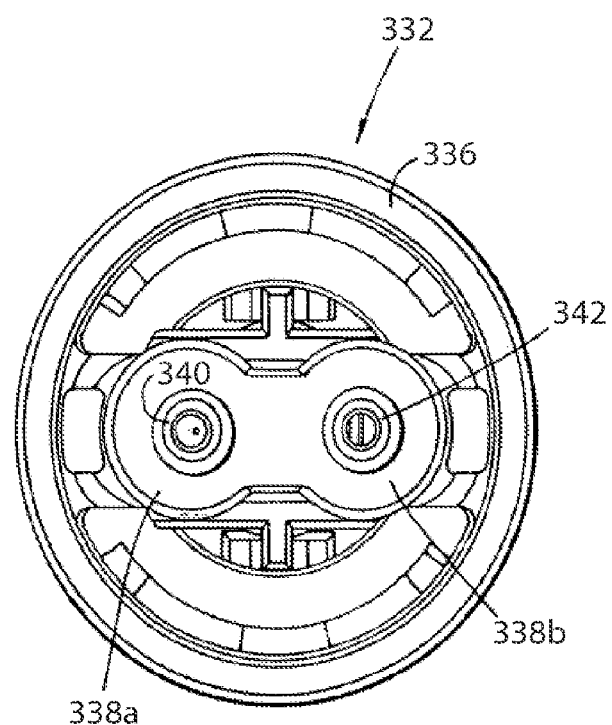
FIG. 26 is an inflow-outflow-connection end view of the distribution manifold of FIG. 24.
Figure 27:
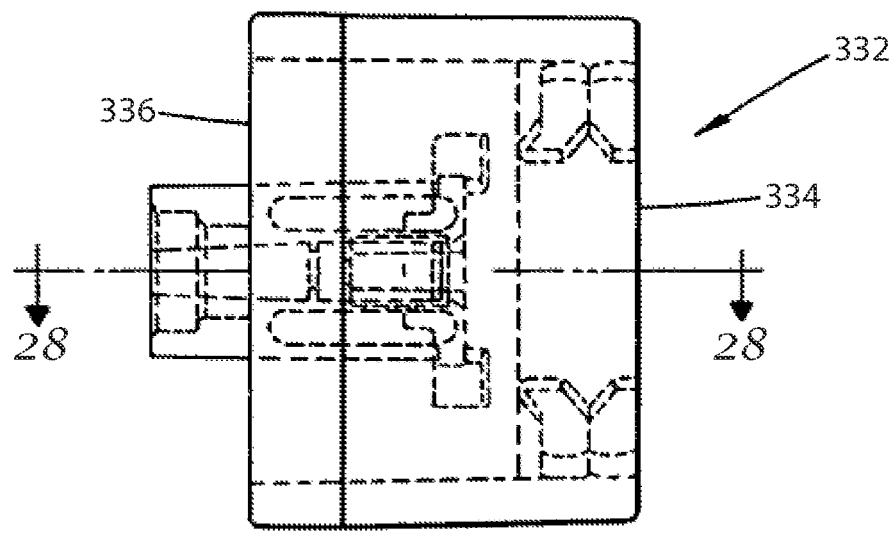
FIG. 27 is a side view of the distribution manifold of FIG. 24 with hidden structure shown in phantom lines.
Figure 28:
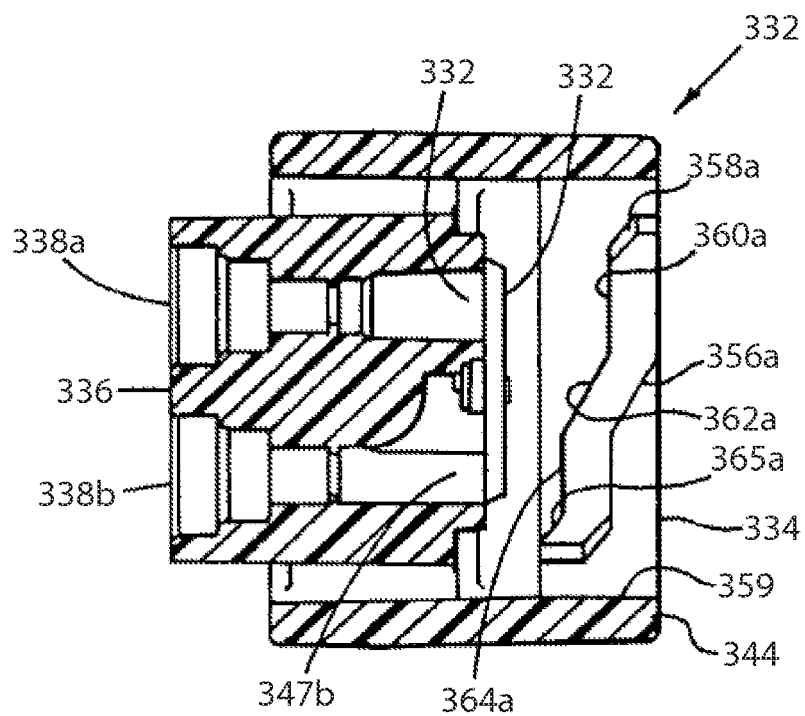
FIG. 28 is a sectional side view of the distribution manifold of FIG. 24 taken along line 28-28 of FIG. 27.
Figure 29:
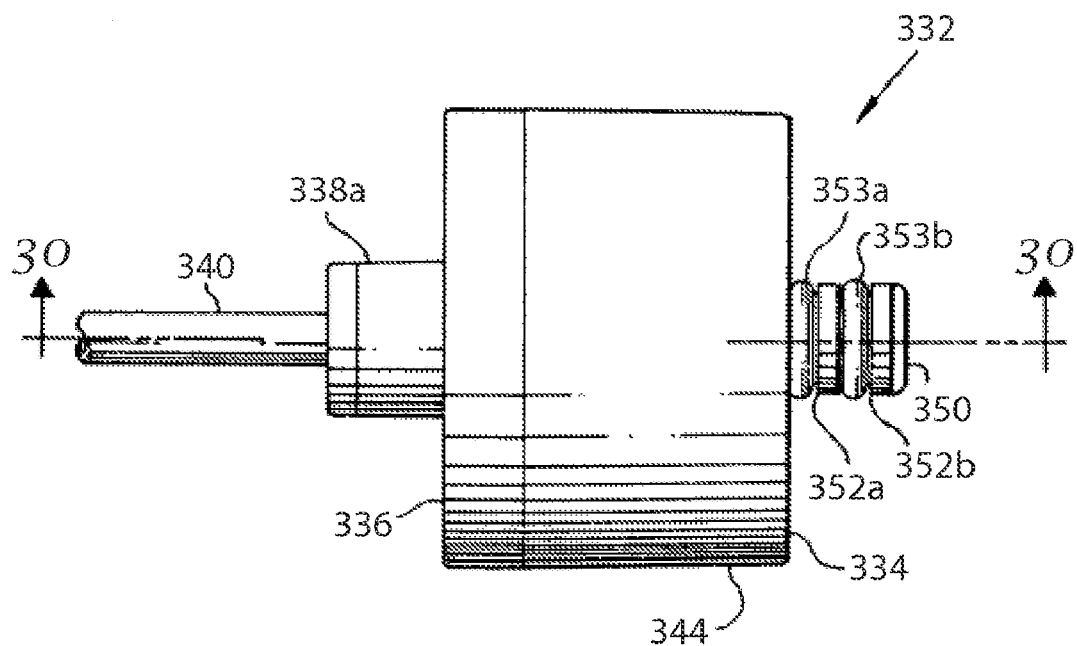
FIG. 29 is a side view of the distribution manifold of FIG. 24.
Figure 30:
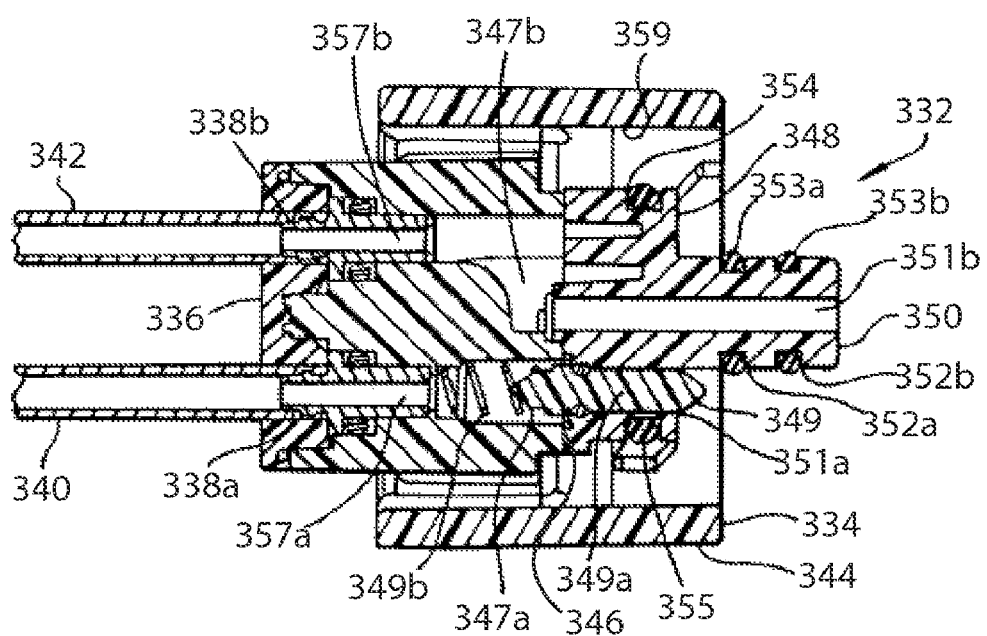
FIG. 30 is a section view of the distribution manifold of FIG. 24 taken at line 30-30 of FIG. 29.

Referring now to FIGS. 24-30, an embodiment of a distribution manifold 332 configured for operable interfacing with filter cartridge 300 is illustrated. Distribution manifold 332 generally comprises a filter end 334 and a distribution end 336, although alternative embodiments can have distribution connections along a side and/or in the same general direction as the filter end. In one representative embodiment, distribution manifold 332 is constructed of the same polymeric material as cartridge filter 300. Alternatively, distribution manifold 332 can comprise an alternative material selected for qualities such as strength, rigidity, cost and/or ease of fabrication. As illustrated in FIGS. 26, 29 and 30, distribution end 336, presently preferably, comprises a pair of tube connectors 338a, 338b for interconnection to a feed water tube 340 and a filtered water tube 342. As illustrated in FIGS. 25, 29 and 30, filter end 334, presently preferably, comprises an exterior wall 344, an engagement surface 346 and an engagement body 348. Engagement surface 346 can comprise a feed throughbore 347a, configured to operatively accept a feed valve assembly 349, and a return throughbore 347b. Feed valve assembly 349 can comprise a valve body 349a and a spring 349b. Engagement body 348 can comprise a projecting member 350, a projecting feed throughbore 351a, a projecting return throughbore 351b, a pair of projection grooves 352a, 352b, a pair of projection seals 353a, 353b, a circumferential groove 354 and a circumferential seal 355. Engagement body 348, presently preferably, is operatively connected to engagement surface 346 such that a feed fluid circuit 357a is defined by the projecting feed throughbore 351a, the feed throughbore 347a, the tube connector 338a and feed water tube 340 while a filtered fluid circuit 357b is defined by the projecting return throughbore 351b, the return throughbore 347b, the tube connector 338b and filtered water tube 342. Return throughbore 351b is, presently preferably, fluidly interconnected with the filtered water tube 342 while the feed throughbore 347 is fluidly interconnected with the feed water tube 340.

Figure 33:
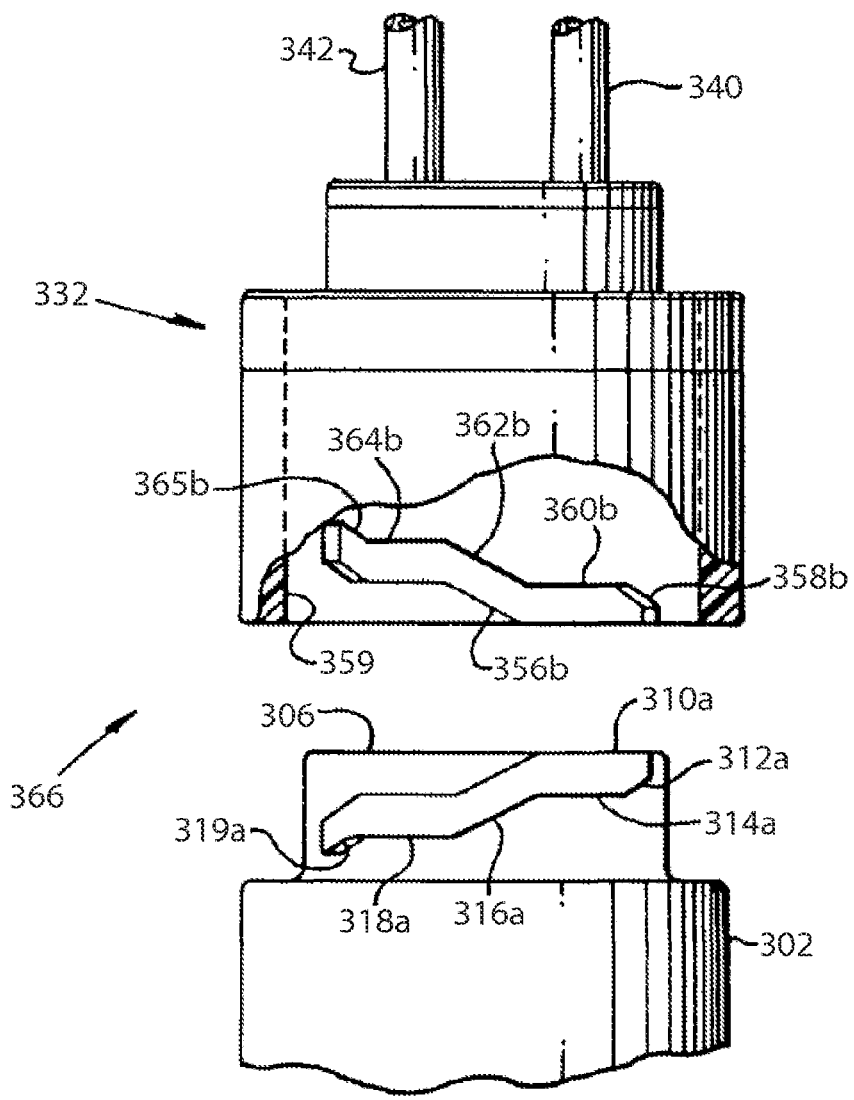
FIG. 33 is a fragmentary, cut-away side view of the water filtration system of FIG. 31 with a portion of the wall of the manifold cut away to show a portion of the multistage ramp engagement mechanism.

As illustrated in FIGS. 25, 28 and 33, filter end 334, presently preferably, comprises a pair of multi-stage manifold attachment members 356a, 356b, illustrated as attachment ramps, on an interior perimeter wall 359 of the distribution manifold 332. Manifold attachment members 356a, 356b are configured correspondingly to multi-stage filter attachment members 310a, 310b such that manifold attachment member 356a, presently preferably, comprises a first angled portion 358a, a first horizontal portion 360a, a second angled portion 362a, second horizontal portion 364a and third angled portion 365a while manifold attachment member 356b similarly comprises a first angled portion 358b, a first horizontal portion 360b, a second angled portion 362b, second horizontal portion 364b and third angled portion 365b.

Figure 31:
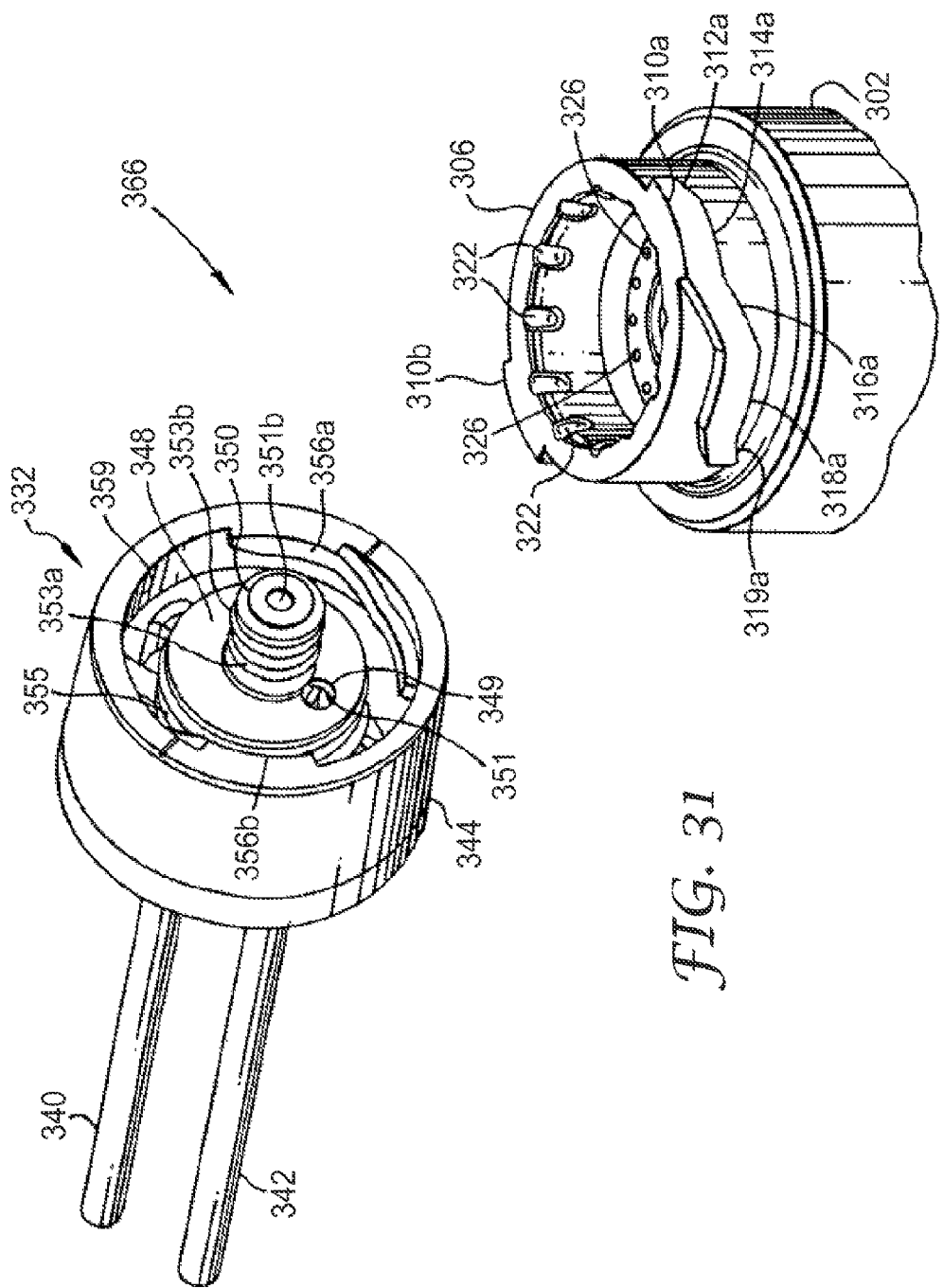
FIG. 31 is an exploded, perspective view of a water filtration system comprising the cartridge filter of FIG. 13 and the distribution manifold of FIG. 24.
Figure 32:
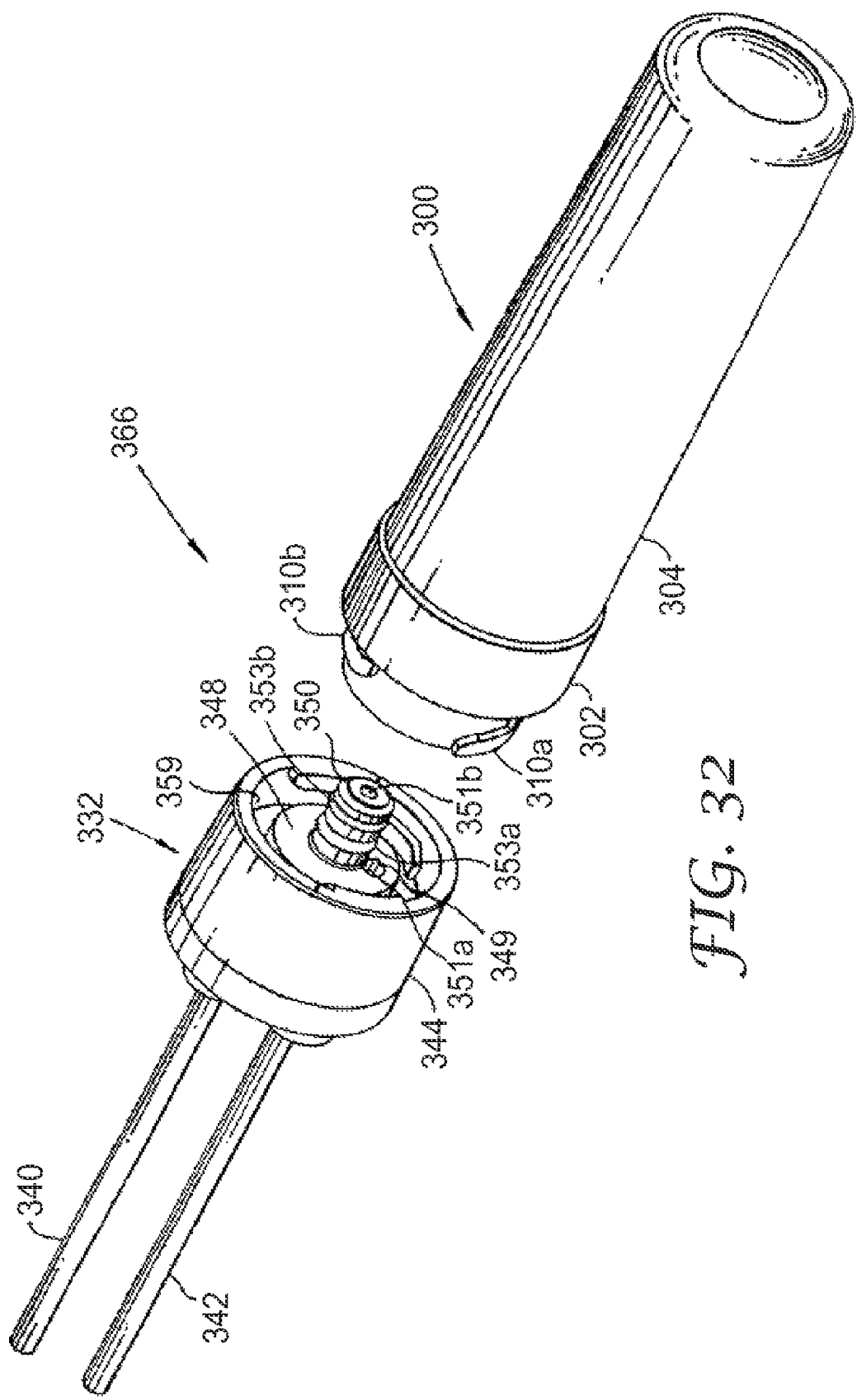
FIG. 32 is an alternative exploded, perspective view of the water filtration system of FIG. 31 with the manifold and cartridge filter aligned for attachment.

In order to provide filtered water, filter cartridge 300 is operatively connected to distribution manifold 332 to form a filtration system 366, as illustrated in a disconnected configuration in FIGS. 31, 32 and 33. First, attachment end 306 is oriented to face filter end 334, as shown in FIGS. 32 and 33. Filter cartridge 300 is directed toward distribution manifold 332 such that the insertion wall 320 enters the interior space defined by exterior wall 344. At the same time, projecting member 350 is aligned with return throughbore 328. At this point, filter attachment members 310a, 310b are in proximity to manifold attachment members 356a, 356b, for example as illustrated in FIG. 34. While engagement of the filter attachment members 310a, 310b and manifold attachment members 356a, 356b is only and illustrated with respect to filter attachment member 310a and manifold attachment member 356a, it will be understood by one of ordinary skill in the art that filter attachment member 310b and manifold attachment member 356b, presently preferably, simultaneously engage in a like manner. Furthermore, it will be understood that in some embodiments both filter attachment members 310a, 310b and manifold attachment members 356a, 356b are, presently preferably, configured in an opposed relation such that filter attachment member 310a engages similarly with both manifold attachment members 356a, 356b while filter attachment member 310b, presently preferably, is also engageable with both manifold attachment members 356a, 356b. In some alternative embodiments, there can be instances in which, only one operable orientation is desired for filter cartridge 300 to operatively connect to distribution manifold 332 to form filtration system 366. One representative example can comprise filtration system 366 utilizing crossflow filtration media with filter cartridge 300, such as, for example, membrane or hollow-fiber based crossflow filtration systems as disclosed in U.S. patent application Ser. No. 10/838,140, published as U.S. Pat. Pub. No. 2004/0251192, which is herein incorporated by reference to the extent not inconsistent with the present disclosure. With respect to crossflow filtration systems, the addition of an additional concentrate fluid circuit in the cartridge filter and/or manifold can necessitate that filter attachment members 310a, 310b and manifold attachment members 356a, 356b engage in a single, specified orientation so as to properly define and complete the additional fluid circuit associated with crossflow filtration systems.

As illustrated in FIG. 34, filter attachment member 310a and manifold attachment member 356a can be positioned such that first angled portion 312a is in proximity to first angled portion 358a. The installer rotatably directs handling end 308, presently preferably, such that the filter cartridge 300 is rotatably inserted with respect to the distribution manifold 332. As the first angled portion 312a and first angled portion 358a, presently preferably, engage each other, the filter cartridge 300 and distribution manifold 332 are drawn closer together. As the filter cartridge 300 is rotated further, first horizontal portion 314a and first horizontal portion 360a are, presently preferably, directed into intimate contact as shown in FIG. 35. This corresponds with the first engagement stage and is a stable engagement position.

As the filter cartridge 300 is rotated further, first angled portion 312a interfaces with second angled portion 362a while the second angled portion 316a engages the first angled portion 358a as shown in FIG. 36, thus, further drawing together filter cartridge 300 and distribution manifold 332 such that projection seals 353a, 353b sealingly engage the wall surrounding return throughbore 328 while circumferential seal 355 sealingly engages the interior perimeter surface of the projecting insertion wall 320. Continued rotation of the filter cartridge 300 causes first horizontal portion 314a to, presently preferably, slidingly contact second horizontal portion 364a while the second horizontal portion 318a engages the first horizontal portion 360a, as shown in FIG. 37. This is the second engagement stage. It will be understood by a person of skill in the art that horizontal portions are substantially horizontal in that they provide resistance against rotation in response to standard operating pressures exerted on the filter cartridge. Attachment of the filter cartridge 300 to the distribution manifold 312 is complete when first angle portion 312a seats against the third angled portion 365a while the third angle portion 319a engages the first angle portion 358a, as illustrated in FIG. 38. As the filter cartridge 300 and distribution manifold 312 approach an installed position, one of the arcuate kick-off ramps 330a, 330b engages the feed valve assembly 349 such that spring 349b is compressed and feed fluid circuit 357a is opened to incoming water. As the rotation of cartridge filter 300 is completed, cartridge filter 300 and distribution manifold 332, presently preferably, cannot disengage without rotating the cartridge filter 300 in a direction opposed to that indicated in FIGS. 40-44.

In operation, feed water flows through the feed flow circuit 357a into the filter cartridge 300. The feed water is directed through the filter media 303 such that selected contaminants such as, for example, ionic, organic or particulate, are removed from the water such that filtered water is present in the center of the filter media 303. Purified water flows out of the filter cartridge 300 by way of the return throughbore 328 and filtered fluid circuit 357b.

During operation of the filtration system 366, pressure such as, for example, water or gas pressure, can become entrained with the filter cartridge 300. If gases are entrained within the filter cartridge 300 during operation, the gases will become compressed by pressure within the system. Depending upon the mounting orientation of the filter cartridge 300, compressed gases can provide for violent disengagement of the filter cartridge 300 from the distribution manifold 332. For example if a filter cartridge 300 is, presently preferably, mounted such that the filter cartridge 300 is above the distribution manifold 332, any compressed gases will be found at the top end of the filter cartridge 300. When the filter cartridge 300 is removed from the distribution manifold 332, compressed gases may drive a pressurized fluid out the bottom of the cartridge filter 300 whereby the cartridge filter 300 is essentially launched from the distribution manifold 332 as gases expand upon release of pressure upon disengagement.

In a filtration assembly with a single stage disengagement mechanism, stored energy within a cartridge filter can cause the violent disengagement of the cartridge filter from a distribution manifold. As described in the present disclosure, any stored energy, stored in the form of a compressed gas or pressurized fluid, is vented prior to the filter cartridge 300 and distribution manifold 332 becoming disengaged. For example, to remove the filter cartridge 300, a user would, presently preferably, direct the handling end 308 in a direction opposed to the installation direction. As the first angle portion 312a slides down the third angle portion 365a, projecting member 350, presently preferably, begins to withdraw from the return throughbore 328 and one of the arcuate kick-off ramps 330a, 330b disengages from the feed valve assembly 349 such that spring 349b is released and feed fluid circuit 357a is closed to incoming water. This, presently preferably, prevents any pressure energy from being imparted to the filter cartridge 300. Further rotation of the cartridge filter causes first angle portion 312a to slide down second angle portion 362a causing projecting member 350 to withdraw farther from the return throughbore 328. This, presently preferably, causes the seal created by projection seals 353a, 353b to be broken when any entrained energy in the filter cartridge 300 is dispelled. The energy, present as fluid or gas pressure, is then vented out venting notches 322. While the pressure is vented, first horizontal portion 314a and first horizontal portion 360a are engaged such that filter cartridge 300 cannot detach from the distribution manifold 332. Venting notches 322 quickly vent any entrained gases allowing the user to continue with the rotatable removal of the filter cartridge 300 such that the first angle portion 312a slides down first angled portion 358a until the filter attachment member 310a and manifold attachment members 356a are no longer engaged and filter cartridge 300 can be completely removed from the distribution manifold 332.

Figure 39:
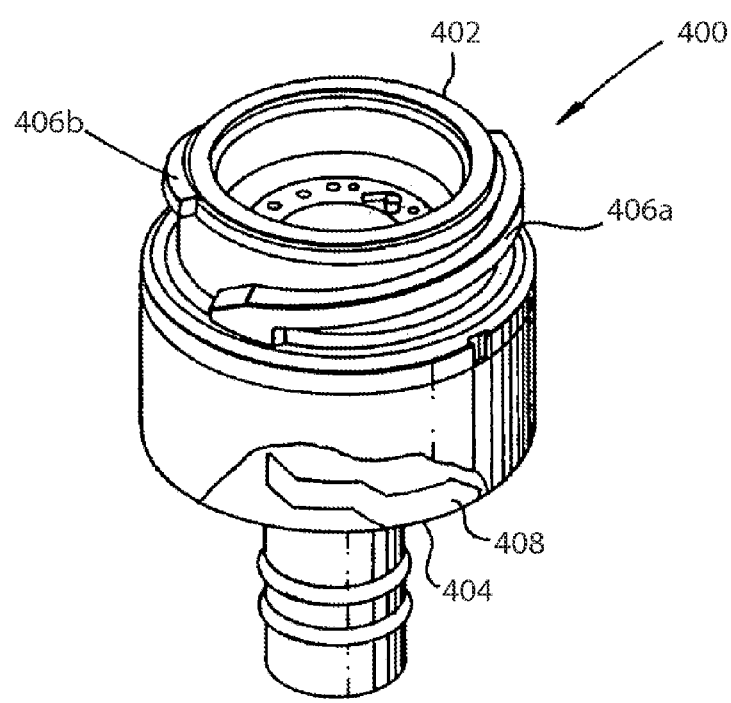
FIG. 39 is a side, perspective view of an adapter for adapting the manifold assembly of FIG. 1 to accept the cartridge filter of FIG. 13.

As illustrated in FIG. 39, an adapter 400 can be used to impart features such as, for example, multi-stage engagement mechanisms and controlled energy venting as previously described in this disclosure, to water filtration systems lacking such features. Adapter 400 can, presently preferably, comprise a manifold end 402 and a filter end 404. As shown in FIG. 39, adapter 400 is, presently preferably, adapted such that the previously described manifold assembly 12 can operatively accept filter cartridge 300. As shown in FIG. 39, manifold end 402 can substantially resemble cartridge top member 16 while filter end 404 can substantially resemble filter end 334. Manifold end 402 can comprise, for example, a pair of manifold attachment members 406a, 406b, shown in FIG. 39 as helical engagement members, such that manifold end 402 is operatively connectable to the manifold assembly 12. Filter end 404 can comprises a pair of multi-stage engagement mechanism 408, such that filter end 404 is operatively connectable to the filter cartridge 300. Manifold end 402 can be adapted such that the adapter 400 remains either permanently operatively connected to the manifold assembly 12 or removal of adapter 400 from manifold assembly 12 required significantly excess torque as compared to removal of the filter cartridge 300 from the filter end 404 such that adapter 400 need only be attached to manifold assembly 12 one time.

Figure 40:
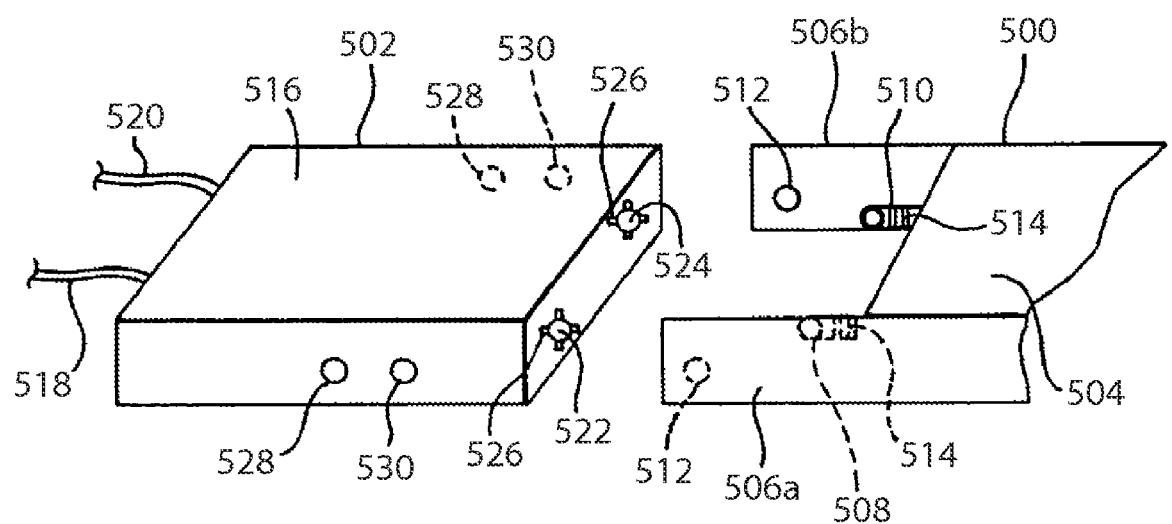
FIG. 40 is an exploded, perspective view of a distribution manifold and a cartridge filter having a linear multi-stage interconnection mechanism.

In addition to rotational engagement of a filter cartridge to a manifold, a filter cartridge 500 and a distribution manifold 502 can be linearly engaged in a multi-stage manner so as allow venting of any entrained energy within filter cartridge 500, for example, as shown in FIG. 40. Filter cartridge 500 can comprise a filter body 504, a pair of engagement arms 506a, 506b, a filter inlet 508 and a filter outlet 510. Engagement arms 506a, 506b can comprise an engagement tab 512. Filter inlet 508 and filter outlet 510 can each comprise at least one sealing member 514. Distribution manifold 502 can comprise a manifold body 516, a feed supply tube 518, a distribution tube 520, a supply bore 522 and a return bore 524. Supply bore 522 and return bore 524 can each comprise at least one vent channel 526. Manifold body 516 can comprise a first engagement recess 528 and a second engagement recess 530 on each side of the manifold body 516.

Filter cartridge 500 is slidably attached to distribution manifold 502 by directing filter inlet 508 into the supply bore 522 and filter outlet 510 into the return bore 524. At substantially the same time, engagement arms 506a, 506b are, presently preferably, slidably advancing over the outside of manifold body 516 until engagement tab 512 is retainably positioned within the corresponding first engagement recess 528. At this point, sealing members 514 sealingly engage the inside perimeters of the supply bore 522 and return bore 524 such that water to be filtered can flow from feed supply tube 518, through supply bore 522, into filter cartridge 500 through the filter inlet 508, out the filter cartridge 500 through the filter outlet 510 and to points of use through distribution tube 520.

To remove or replace the filter cartridge 500, one slidably directs the filter cartridge 500 away from the distribution manifold 502. As the engagement tab 512 approaches the second engagement recess 530, the seal created by sealing members 514 and the inner perimeter of supply bore 522 and return bore 524 are, presently preferably, broken allowing any retained energy in the filter cartridge 500 to be released or vented through the vent channel 526. As the filter cartridge 500 is vented, filter cartridge 500 is retainably attached to the distribution manifold 502 through the interaction of engagement tabs 512 and the second engagement recesses 530. In alternative embodiments, the fluid connections and engagement structures or portions thereof can be reversed relative to the filter cartridge and the manifold assembly to form other slidably engaging filter assemblies. Similarly, other designs of flow connectors can be effectively used for slidably engaging structures.

While the applicant has disclosed and discussed a variety of representative embodiments, it will be understood by one of ordinary skill in the art that a variety of alternative embodiments are contemplated within the scope and breadth of the present application. Accordingly, the applicant intends to be limited only by the claims appended hereto.

What is claimed is:

1. A filter cartridge comprising:
 a filter body comprising a filter media; and
 a filter cap joined to the filter body comprising:
  a filter inlet;
  a filter outlet; and
  a cartridge engagement mechanism for engaging a compatible manifold assembly, the cartridge engagement mechanism comprising a pair of opposed multi-stage filter attachment members each comprising an attachment ramp comprising a first horizontal portion facing toward the filter body, a second angled portion adjacent the first horizontal portion, and a second horizontal portion facing toward the filter body and adjacent the second angled portion.

2. The filter cartridge of claim 1 wherein the attachment ramp on each opposed multi-stage filter attachment member further comprises a first angled portion adjacent the first horizontal portion.

3. The filter cartridge of claim 2 wherein the attachment ramp on each opposed multi-stage filter attachment member further comprises a third angled portion adjacent the second horizontal portion.

4. The filter cartridge of claim 1 wherein the attachment ramp on each opposed multi-stage filter attachment member further comprises a third angled portion adjacent the second horizontal portion.

5. The filter cartridge of claim 1 wherein the pair of opposed multi-stage filter attachment members are identically configured.

6. The filter cartridge of claim 1 wherein the filter cap further comprises a kick-off ramp to engage a feed valve assembly on the compatible manifold assembly.

7. The filter cartridge of claim 6 wherein the kick-off ramp is arcuate.

8. The filter cartridge of claim 6 comprising a pair of kick-off ramps.

9. The filter cartridge of claim 6 wherein the kick-off ramp is aligned with the pair of opposed multi-stage filter attachment members such that the kick-off ramp engages the feed valve when the first horizontal portion of each attachment ramp of the opposed multi-stage filter attachment members is in contact with a second horizontal portion of an attachment ramp on the compatible manifold assembly.

10. The filter cartridge of claim 9 wherein the kick off ramp does not engage the feed valve when the first horizontal portion of each attachment ramp of the opposed multi-stage filter attachment members is in contact with a first horizontal portion of the attachment ramp on the compatible manifold assembly.

11. The filter cartridge of claim 1 wherein the filter inlet comprises a plurality of feed throughbores.

12. The filter cartridge of claim 1 wherein the filter outlet comprises a return throughbore.

13. A filter cartridge comprising:
    a filter body comprising a filter media; and
    a filter cap joined to the filter body comprising:
        a filter inlet;
        a filter outlet;
        a cartridge engagement mechanism for engaging a compatible manifold assembly, the cartridge engagement mechanism comprising a pair of opposed multi-stage filter attachment members each comprising an attachment ramp comprising a first angled portion adjacent a first horizontal portion facing toward the filter body, a second angled portion adjacent the first horizontal portion, and a second horizontal portion facing toward the filter body and adjacent the second angled portion; and
        a kick-off ramp to engage a feed valve assembly on the compatible manifold assembly.

14. The filter cartridge of claim 13 comprising a pair of kick-off ramps.

15. The filter cartridge of claim 13 wherein the kick-off ramp is aligned with the pair of opposed multi-stage filter attachment members such that the kick-off ramp engages the feed valve when the first horizontal portion of each attachment ramp of the opposed multi-stage filter attachment members is in contact with a second horizontal portion of an attachment ramp on the compatible manifold assembly.

16. The filter cartridge of claim 15 wherein the kick off ramp does not engage the feed valve when the first horizontal portion of each attachment ramp of the opposed multi-stage filter attachment members is in contact with a first horizontal portion of the attachment ramp on the compatible manifold assembly.

17. A method of engaging a filter cartridge comprising a filter attachment member with a distribution manifold comprising a manifold attachment member, the filter attachment member comprising:
    a filter first angled portion, a filter first horizontal portion, a filter second angled portion, and a filter second horizontal portion; and
the manifold attachment member comprising:
    a manifold first angled portion, a manifold first horizontal portion, a manifold second angled portion, and a manifold second horizontal portion;
the method comprising:
    positioning the filter first angled portion in proximity to the manifold first angled portion;
    rotating the filter cartridge to engage the filter first angled portion with the manifold first angled portion such that the filter cartridge and distribution manifold are drawn closer together;
    further rotating the filter cartridge such that the filter first horizontal portion is directed into intimate contact with the manifold first horizontal portion;
    further rotating the filter cartridge such that the filter first angled portion interfaces with the manifold second angled portion while the filter second angled portion engages the manifold first angled portion, thus further drawing together the filter cartridge and the distribution manifold; and
    further rotating the filter cartridge to cause the filter first horizontal portion to slidingly contact the manifold second horizontal portion while the filter second horizontal portion engages the manifold first horizontal portion.

18. The method of claim 17 further comprising:
    further rotating the filter cartridge such that the filter first angled portion seats against a manifold third angled portion on the manifold attachment member while a filter third angled portion on the filter attachment member engages the manifold first angled portion.

19. The method of claim 18 further comprising:
    after rotating the filter cartridge to cause the filter first horizontal portion to slidingly contact the manifold second horizontal portion while the filter second horizontal portion engages the manifold first horizontal portion, engaging a feed valve assembly on the distribution manifold with a kick-off ramp on the filter cartridge such that a feed fluid circuit is opened to incoming water.

20. The method of claim 17 further comprising:
    after rotating the filter cartridge to cause the filter first horizontal portion to slidingly contact the manifold second horizontal portion while the filter second horizontal portion engages the manifold first horizontal portion, engaging a feed valve assembly on the distribution manifold with a kick-off ramp on the filter cartridge such that a feed fluid circuit is opened to incoming water.

* * * * *

UNITED STATES PATENT AND TRADEMARK OFFICE
CERTIFICATE OF CORRECTION

PATENT NO.       : 8,182,699 B2                                        Page 1 of 1
APPLICATION NO.  : 12/860017
DATED            : May 22, 2012
INVENTOR(S)      : Karl Fritze It is certified that error appears in the above-identified patent and that said Letters Patent is hereby corrected as shown below:

Column 7
Line 35, delete "74" and insert -- 84 --.
Line 50, delete "74" and insert -- 84 --.

Column 11
Line 58, delete "compete" and insert -- complete --.

Column 12
Line 21, delete "Like." and insert -- like. --.

Column 13
Line 46, after "only" insert -- described --.

Signed and Sealed this
Second Day of October, 2012

David J. Kappos
*Director of the United States Patent and Trademark Office*